(12) United States Patent
Mather

(10) Patent No.: US 9,725,019 B2
(45) Date of Patent: Aug. 8, 2017

(54) VEHICLE FLOOR ASSEMBLY

(71) Applicant: Carl Mather, Lake Orion, MI (US)

(72) Inventor: Carl Mather, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 76 days.

(21) Appl. No.: 14/719,453

(22) Filed: May 22, 2015

(65) Prior Publication Data

US 2016/0339812 A1    Nov. 24, 2016

(51) Int. Cl.
*B60N 2/30*      (2006.01)

(52) U.S. Cl.
CPC .................................. *B60N 2/3075* (2013.01)

(58) Field of Classification Search
CPC .. B60N 2/3065; B60N 2/3011; B60N 2/3075; B60N 2/309; B60N 2/3045; B60N 2/3079; B60N 2/3093; B62D 25/10; B62D 25/087; B62D 25/20; B62D 33/0625; B62D 43/06; B62D 43/10; B62D 25/2036
USPC ....... 296/65.09, 66, 65.01, 37.14, 65.14, 64, 296/65.11, 65.13; 297/15, 344.1, 334, 297/378.1, 463.1
See application file for complete search history.

(56) References Cited

U.S. PATENT DOCUMENTS

| | | | |
|---|---|---|---|
| 5,195,795 A * | 3/1993 | Cannera ............... | B60N 2/0292 296/65.09 |
| 6,279,982 B1 | 8/2001 | Nishimura et al. | |
| 6,869,138 B2 | 3/2005 | Rhodes et al. | |
| 6,955,386 B2 | 10/2005 | Rhodes et al. | |
| 6,962,384 B2 | 11/2005 | Rhodes et al. | |
| 7,011,352 B2 * | 3/2006 | Matsuoka ................ | B60R 7/04 296/37.14 |
| 7,066,519 B2 | 6/2006 | Rhodes et al. | |
| 7,077,451 B2 | 7/2006 | Rhodes et al. | |
| 7,377,571 B2 | 5/2008 | Ewers et al. | |
| 8,056,952 B2 * | 11/2011 | Almeida ............... | B60N 2/062 296/37.8 |
| 8,485,583 B2 * | 7/2013 | Mather ............... | B60N 2/3075 296/37.14 |
| 8,632,113 B2 | 1/2014 | Mather et al. | |

(Continued)

FOREIGN PATENT DOCUMENTS

| | | |
|---|---|---|
| DE | 19957380 C1 | 3/2001 |
| FR | 2896459 A1 | 7/2007 |

(Continued)

*Primary Examiner* — Glenn Dayoan
*Assistant Examiner* — Sunsurraye Westbrook
(74) *Attorney, Agent, or Firm* — Ralph E. Smith

(57) ABSTRACT

A vehicle floor assembly includes a floor frame, first panel, second panel, first hinge, second hinge, third hinge, and door member. The floor frame defines a stowage cavity adapted to receive a seat assembly in a stowed position. The second panel defines an aperture that extends through the second panel to be in communication with the stowage cavity. The first hinge couples the first panel to the second panel. The second hinge couples the second panel to the floor frame. The door member is coupled to the second panel by the third hinge. The door member is moveable relative to the second panel between an open position wherein the aperture of the second panel is open to permit access to the stowage cavity, and a closed position wherein the door member covers the aperture to prevent access to the stowage cavity.

19 Claims, 26 Drawing Sheets

(56) References Cited

U.S. PATENT DOCUMENTS

| | | | |
|---|---|---|---|
| 8,651,550 B2* | 2/2014 | Mather | B60N 2/3075 296/37.14 |
| 2007/0210601 A1 | 9/2007 | Phillips et al. | |
| 2008/0224524 A1 | 9/2008 | Mather et al. | |

FOREIGN PATENT DOCUMENTS

| | | | |
|---|---|---|---|
| FR | 2917680 A1 | 12/2008 | |
| WO | 2004043730 A2 | 5/2004 | |

* cited by examiner

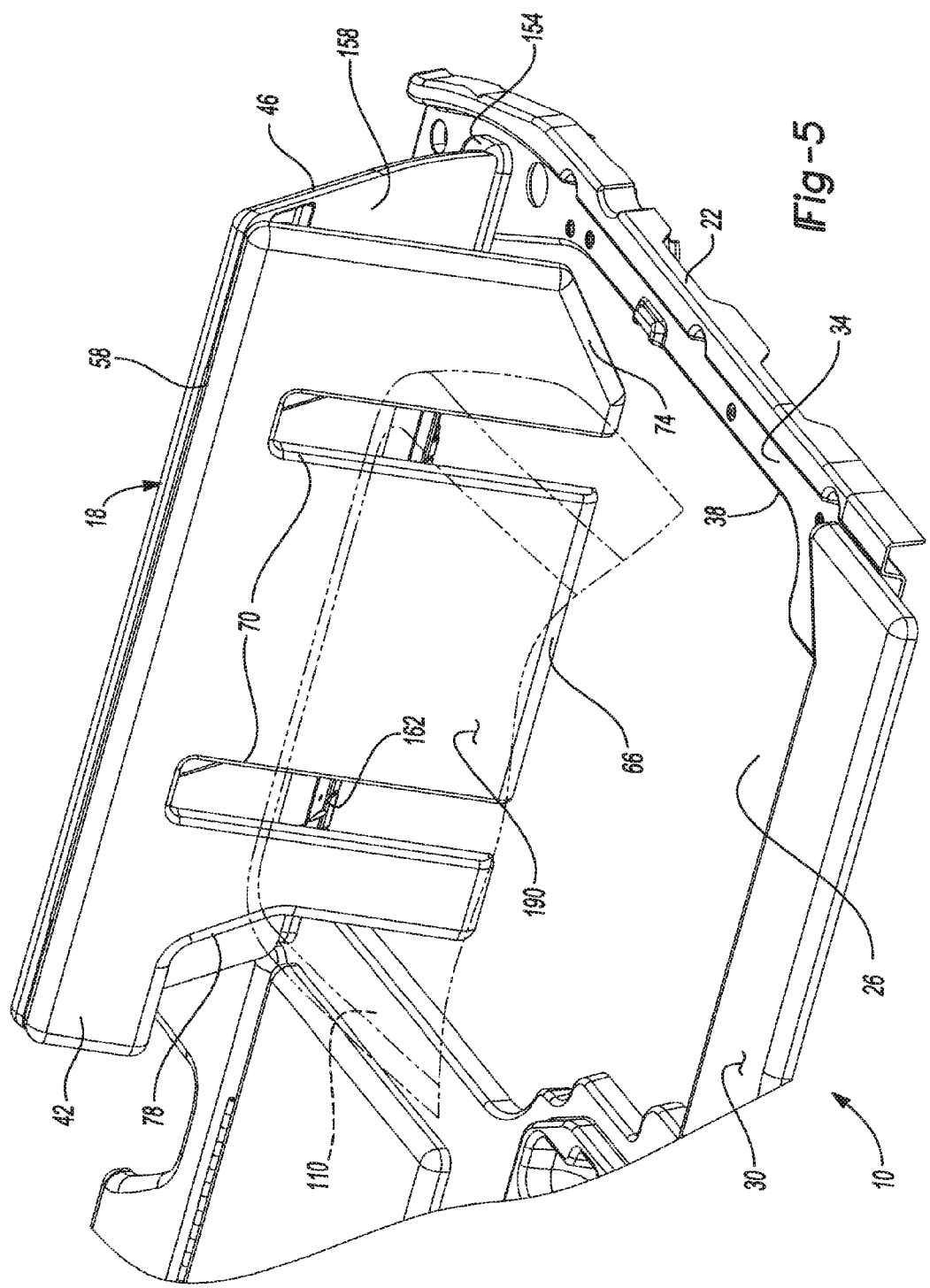

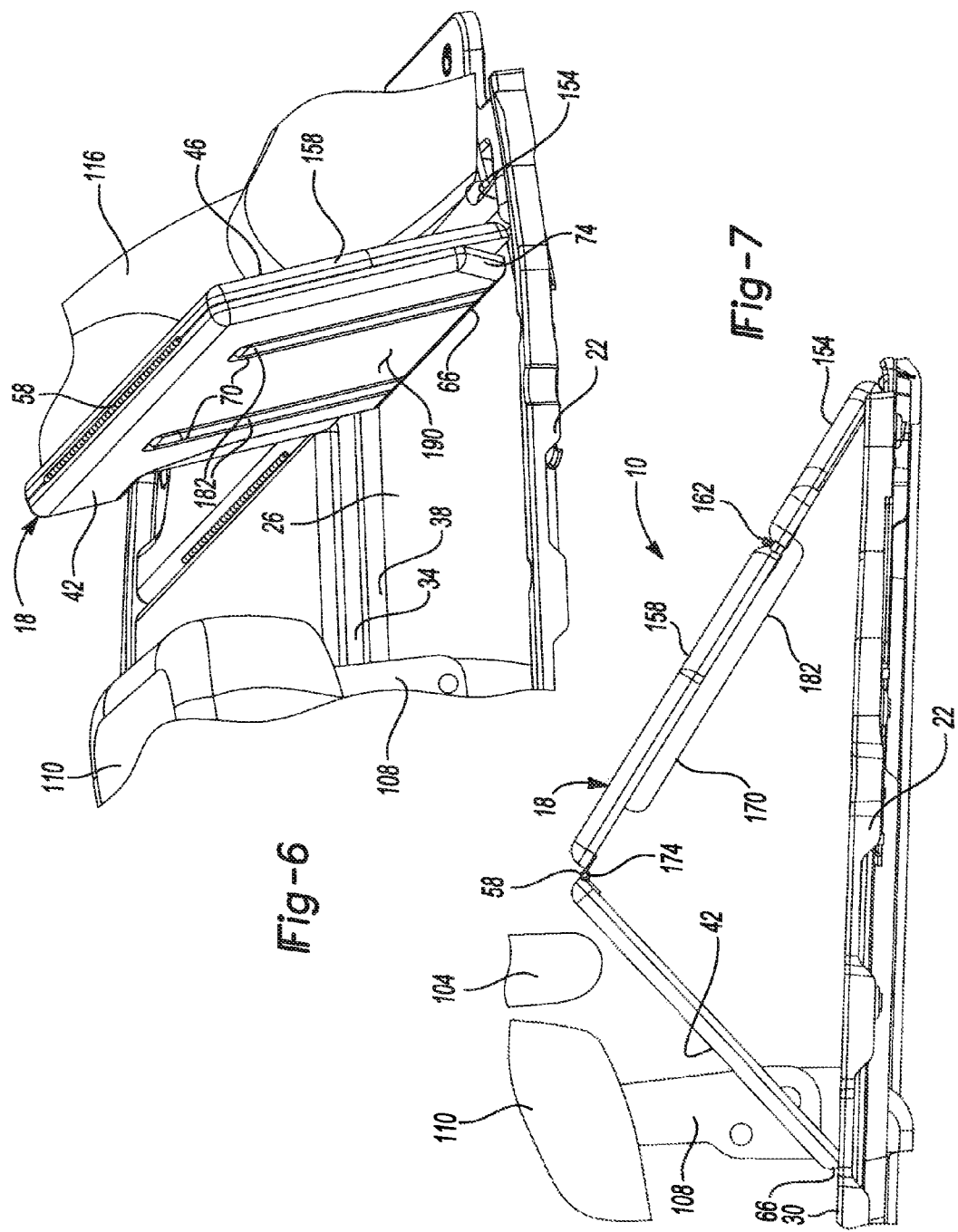

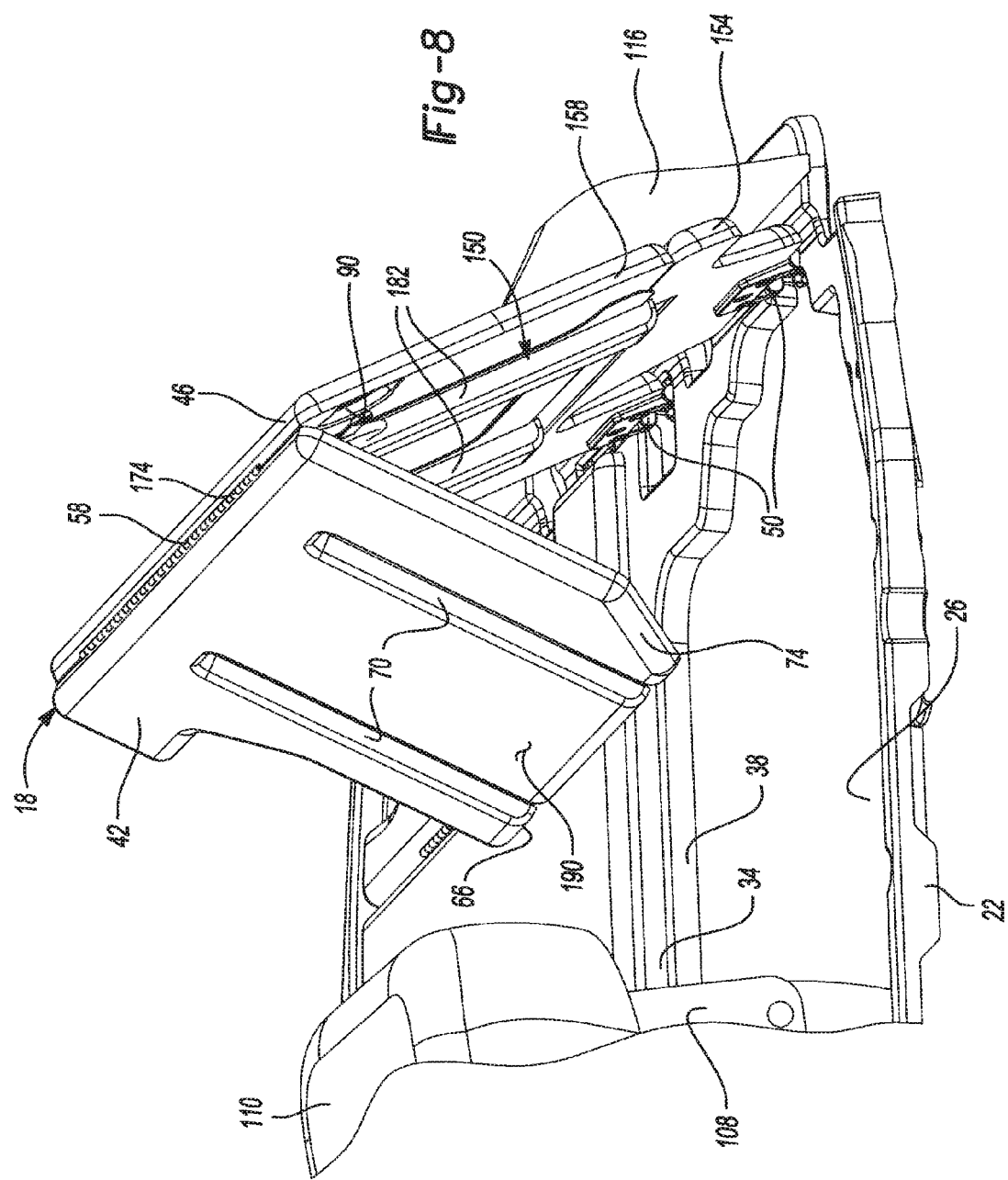

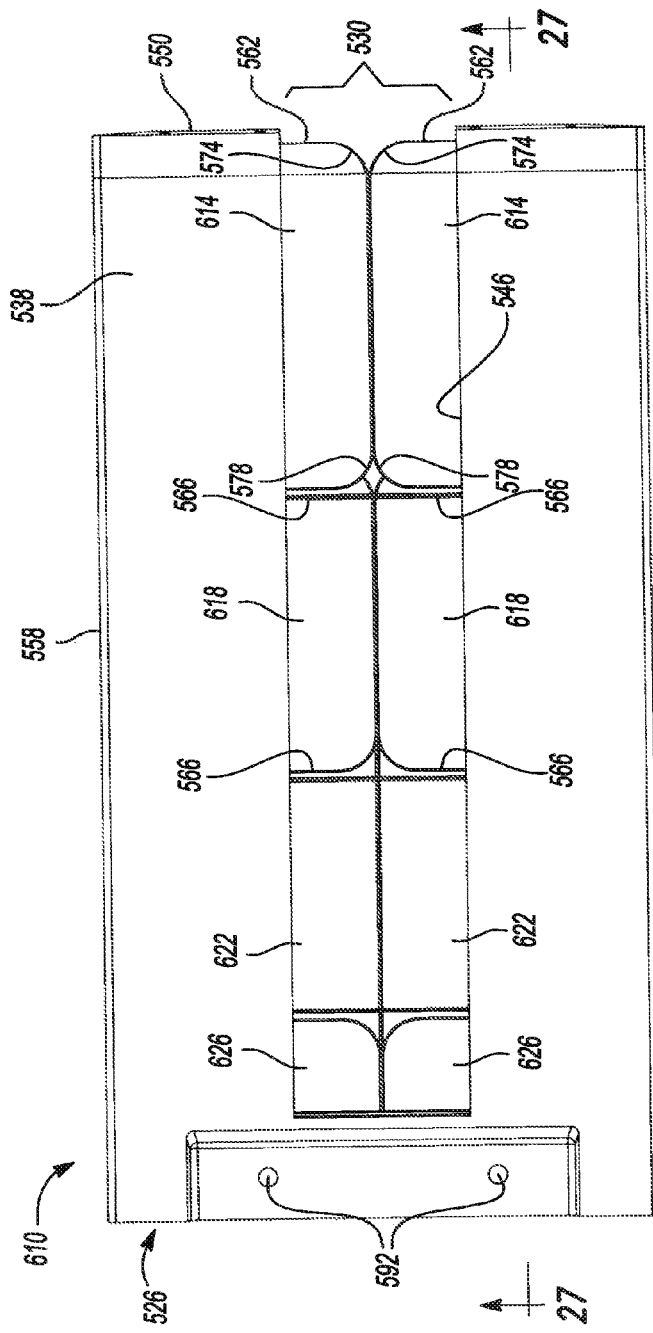
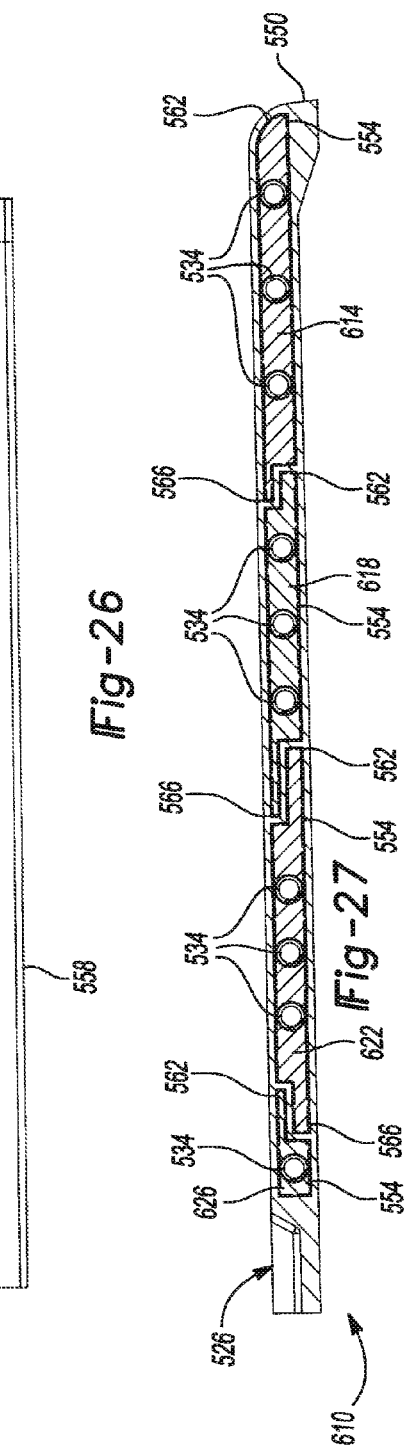

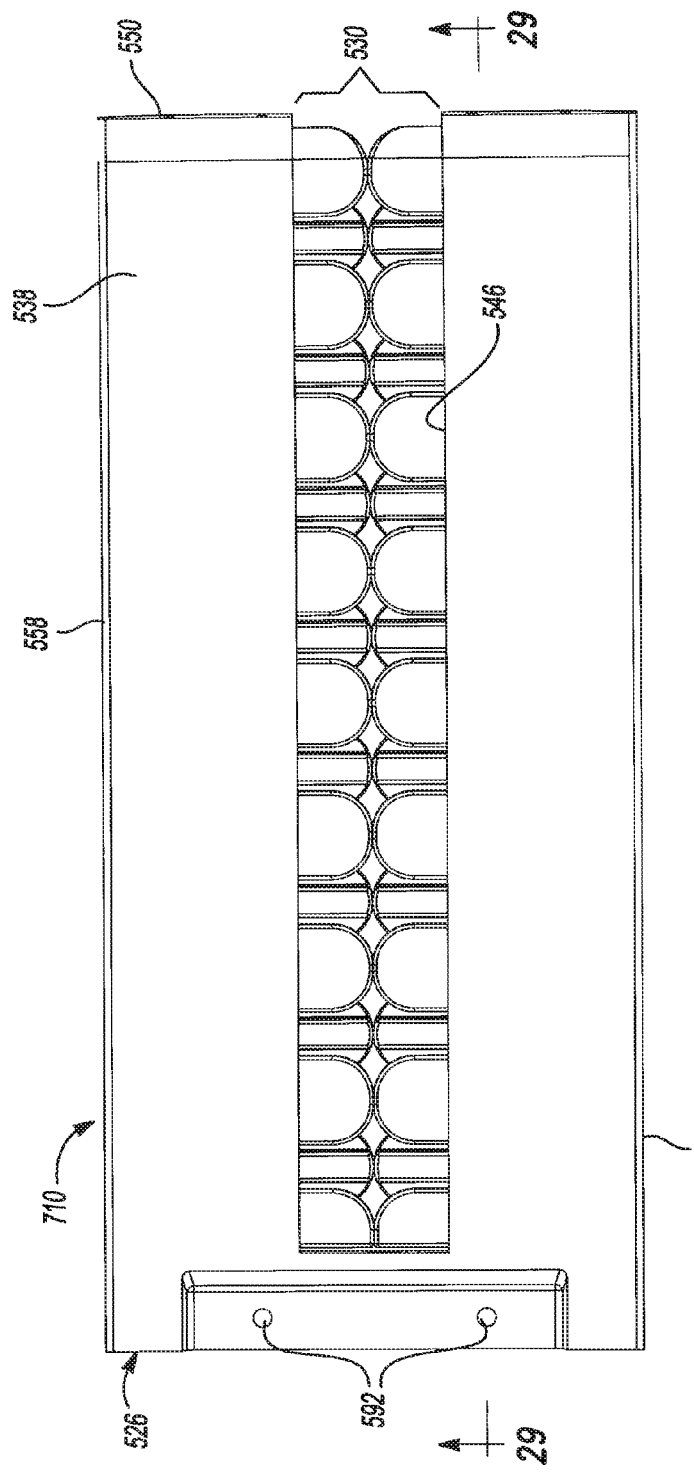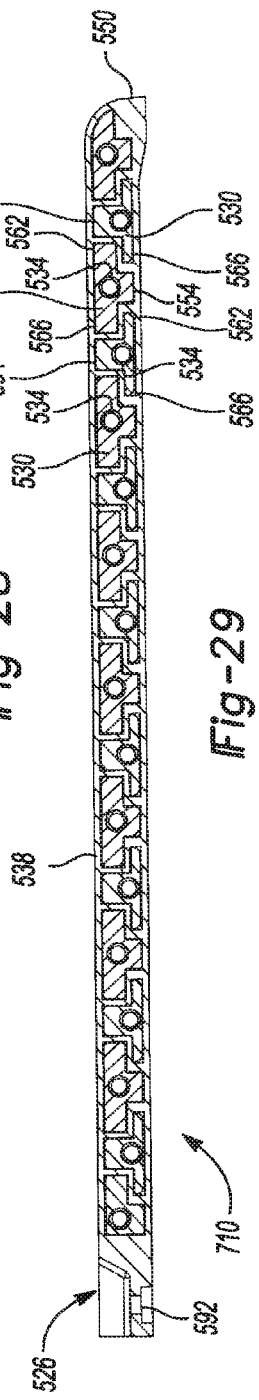

VEHICLE FLOOR ASSEMBLY

FIELD

The present disclosure relates to vehicle floor assemblies.

BACKGROUND

This section provides background information related to the present disclosure and is not necessarily prior art.

In motor vehicles such as vans, mini-vans and sport utility vehicles, it is desirable that passenger seat assemblies be moveable between a number of positions, such as a design position wherein an occupant can sit upon the seat portion of the seat assembly, and an access position wherein the seat assembly is tumbled forward to allow access to cargo or additional seating located behind the seat assembly. It is also desirable to permit the seat assembly to be optionally stowable on-board the vehicle when not in use to provide additional or improved storage capacity for carrying cargo.

One potential solution to this desire for additional storage capacity is a seat assembly that is capable of being stowed within a stowage compartment located within the floor of the vehicle (e.g. below a load floor of the vehicle). Typically, a panel of the load floor is removed to reveal the stowage compartment. Then the seat assembly is folded and moved into the stowage compartment to be covered by the replaced panel of the load floor. Such stowage compartments can also be used to store cargo under the load floor when the seat assembly is not stowed. One drawback of current vehicles with stowable seats is the need to fold or articulate large floor panel assemblies around multiple seat assemblies and around the risers that support the deployed seat assembly in order to access the stowage compartment. Another drawback of the current vehicles is that the load floor typically includes apertures where the seat risers extend through the load floor. Such apertures are typically larger than the risers to account for manufacturing tolerances and to permit the seat assembly to be moved between the design position and the access position. Such apertures in the load floor can permit errant objects to fall under the load floor.

Thus, while vehicle floor assemblies for stowable seat assemblies have generally worked for their intended purpose, there remains a need for continuous improvement in the relevant art.

SUMMARY

In accordance with an aspect of the present disclosure, a vehicle floor assembly includes a floor frame, a first floor panel, a second floor panel, a first hinge, a second hinge, a third hinge, and a door member. The floor frame defines a stowage cavity adapted to receive a seat assembly in a stowed position. The second floor panel defines an aperture that extends through the second floor panel to be in communication with the stowage cavity. The first hinge couples the first floor panel to the second floor panel. The second hinge couples the second floor panel to the floor frame. The door member is coupled to the second floor panel by the third hinge. The door member is moveable relative to the second floor panel between an open position wherein the aperture of the second floor panel is open to permit access to the stowage cavity, and a closed position wherein the door member covers the aperture to prevent access to the stowage cavity.

In accordance with an aspect of the present disclosure, the second floor panel includes a rim that defines the aperture. The floor frame includes a lip disposed about the stowage cavity. The lip is configured to support the rim above the stowage cavity.

In accordance with an aspect of the present disclosure, the lip of the floor frame is recessed from a top surface of the floor frame. The second floor panel and the door member have respective top surfaces that are substantially level with the top surface of the floor frame when the second floor panel is in a first position and the door member is in the closed position.

In accordance with an aspect of the present disclosure, the door member includes a plateau and a door rim. When the door is in the closed position, the door rim is supported by the rim of the second floor panel and the plateau is received in the aperture of the second floor panel.

In accordance with an aspect of the present disclosure, a portion of the door rim overlaps with the lip of the floor frame.

In accordance with an aspect of the present disclosure, the third hinge is coupled to a side of the door member that is proximate to the first hinge.

In accordance with an aspect of the present disclosure, when the load floor is moved between the first and second positions, the first and second hinges are configured to pivot in opposite directions.

In accordance with an aspect of the present disclosure, the first floor panel defines a pair of slots adapted to receive a pair of risers of the seat assembly through the first panel when the seat assembly is in a deployed position.

In accordance with an aspect of the present disclosure, the load floor further includes a pair of closeout devices coupled to the first floor panel. Each closeout device is associated with one of the slots. Each closeout device includes a set of closeout members and a plurality of biasing members. The closeout members are slidably coupled to the first floor panel on opposite sides of the slot, and are moveable between a retracted position wherein opposing closeout members are retracted relative to the slot, and an extended position wherein opposing closeout members extend into the slot toward each other a greater extent than when in the retracted position. The biasing members are configured to bias the closeout members toward the extended position.

In accordance with an aspect of the present disclosure, the load floor further includes a closeout panel and a fourth hinge. The closeout panel defines a pair of closeout members configured to be received in the slots. The fourth hinge couples the closeout panel to the first and second floor panels to permit the closeout panel to be pivoted between a first position wherein each closeout member is received in one of the slots, and a second position wherein the closeout members are spaced apart from the slots.

In accordance with an aspect of the present disclosure, In accordance with an aspect of the present disclosure, a vehicle floor assembly includes a floor frame and a load floor. The floor frame defines a stowage cavity adapted to receive a seat assembly in a stowed position. The floor frame includes a support lip disposed about a perimeter of the stowage cavity. The load floor is coupled to the floor frame and configured to be moved between a first position wherein the load floor covers the stowage cavity, and a second position wherein the stowage cavity is open to permit the seat assembly to be moved from a deployed position to the stowed position. The load floor includes a first floor panel, a second floor panel, a first hinge, a second hinge, a third hinge, and a door member. The first floor panel is configured to be supported above the stowage cavity by the support lip when the load floor is in a first position. The second floor panel defines an aperture that extends through the second floor panel to be in communication with the stowage cavity when the load floor is in the first position. The first hinge couples the first floor panel to the second floor panel. The second hinge couples the second floor panel to the floor frame. The door member is coupled to the second floor panel by the third hinge. The door member is moveable relative to the second floor panel between an open position wherein the aperture of the second floor panel is open to permit access to the stowage cavity while the seat assembly is in the deployed position and the load floor is in the first position, and a closed position wherein the door member covers the aperture to prevent access to the stowage cavity when the load floor is in the first position.

In accordance with an aspect of the present disclosure, the second floor panel includes a rim that defines the aperture, the support lip supporting the rim above the stowage cavity when the load floor is in the first position.

In accordance with an aspect of the present disclosure, the support lip is recessed from a top surface of the floor frame. The second floor panel and the door member have respective top surfaces that are substantially level with the top surface of the floor frame when the load floor is in a first position and the door member is in the closed position.

In accordance with an aspect of the present disclosure, the door member includes a plateau and a door rim. When the load floor is in the first position and the door is in the closed position, the door rim is supported by the rim of the second floor panel and the plateau is received in the aperture of the second floor panel.

In accordance with an aspect of the present disclosure, when the load floor is in the first position and the door is in the closed position, a portion of the door rim overlaps with the support lip.

In accordance with an aspect of the present disclosure, the third hinge is coupled to a side of the door member that is proximate to the first hinge.

In accordance with an aspect of the present disclosure, when the load floor is moved between the first and second positions, the first and second hinges are configured to pivot in opposite directions.

In accordance with an aspect of the present disclosure, the first floor panel defines a pair of slots adapted to receive a pair of risers of the seat assembly through the first panel when the seat assembly is in a deployed position.

In accordance with an aspect of the present disclosure, the load floor further includes a pair of closeout devices coupled to the first floor panel. Each closeout device is associated with one of the slots. Each closeout device includes a set of closeout members and a plurality of biasing members. The closeout members are slidably coupled to the first floor panel on opposite sides of the slot, and are moveable between a retracted position wherein opposing closeout members are retracted relative to the slot, and an extended position wherein opposing closeout members extend into the slot toward each other a greater extent than when in the retracted position. The biasing members are configured to bias the closeout members toward the extended position.

In accordance with an aspect of the present disclosure, the load floor further includes a closeout panel and a fourth hinge. The closeout panel defines a pair of closeout members configured to be received in the slots. The fourth hinge couples the closeout panel to the first and second floor panels to permit the closeout panel to be pivoted between a first position wherein each closeout member is received in one of the slots, and a second position wherein the closeout members are spaced apart from the slots.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 5 is a perspective view of a portion of the vehicle of FIG. 1, illustrating the load floor assembly in a third position;

FIG. 6 is a perspective view of a portion of the vehicle of FIG. 1, illustrating the load floor assembly in a fourth position;

FIG. 7 is a side view of a portion of the vehicle of FIG. 1, illustrating the load floor assembly in a fifth position;

FIG. 8 is a perspective view of a portion of the vehicle of FIG. 1, illustrating the load floor assembly in a sixth position;

FIG. 26 is a top plan view of a portion of a load floor assembly of a fifth construction in accordance with the present teachings;

FIG. 27 is a sectional view of the portion of the load floor assembly of FIG. 26, cut along line 27-27 of FIG. 26;

FIG. 28 is a top plan view of a portion of a load floor assembly of a sixth construction in accordance with the present teachings; and FIG. 29 is a sectional view of the portion of the load floor assembly of FIG. 28, cut along line 29-29 of FIG. 28.

DETAILED DESCRIPTION

The present disclosure is directed toward a vehicle load floor assembly that permits a vehicle seat assembly to be stowed within a stowage container or tub that is recessed within the vehicle's floor. According to one aspect of the present disclosure, the load floor assembly includes a pair of slots that are defined by a panel of the load floor assembly and a gap hider device. The slots permit risers of the vehicle seat to extend through the panel of the load floor assembly. The gap hider device closes the slots when the seat assembly is stowed. According to another aspect of the present disclosure, a gap hider device reduces or eliminates the gaps around and/or between the risers when the seat assembly is not stowed (e.g. when the seat assembly is deployed). According to another aspect of the present disclosure, a load floor assembly includes a door panel that permits convenient access to cargo stored within the stowage tub when the seat assembly is not stowed, without the need to articulate multiple load floor panels.

Figure 1:
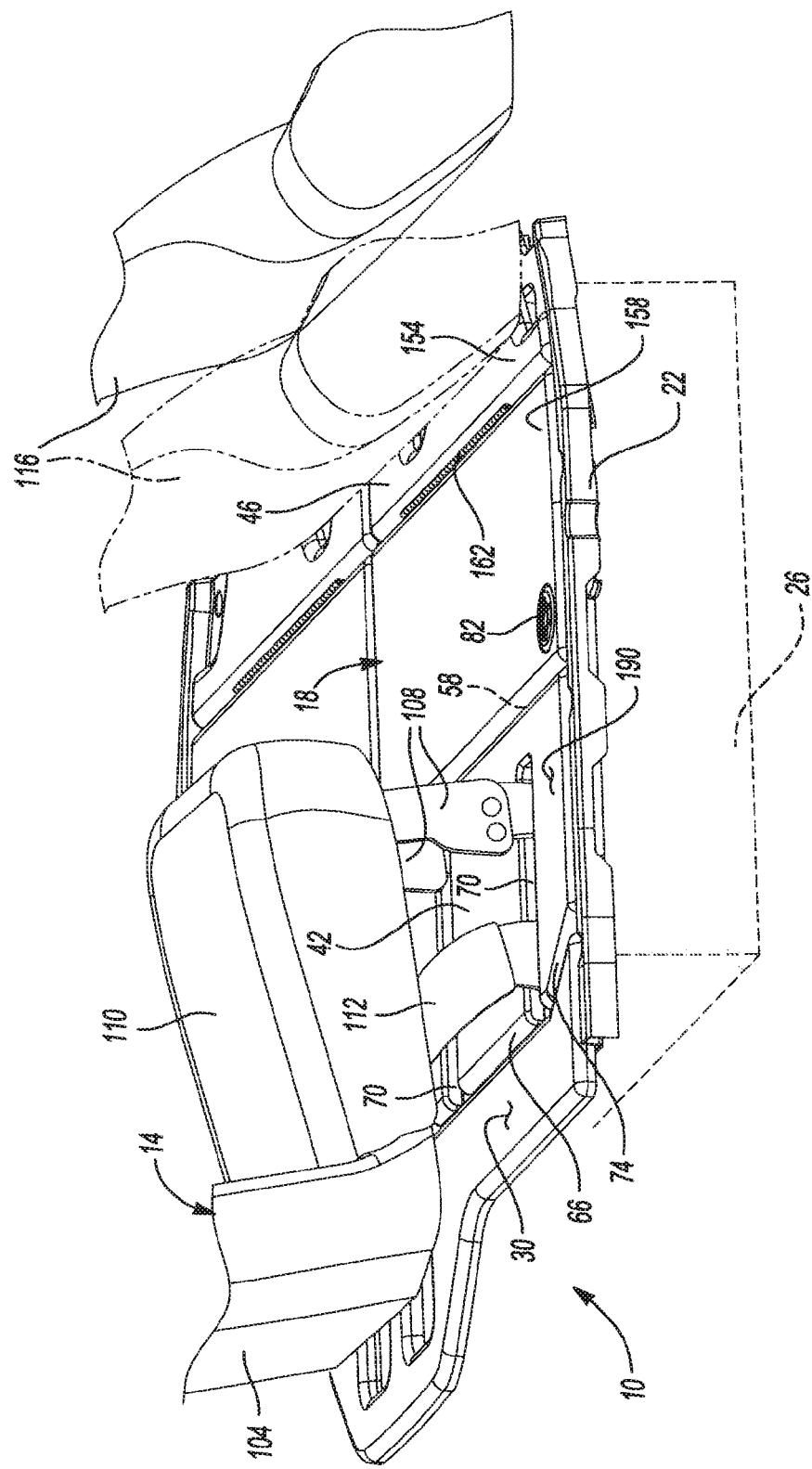
FIG. 1 is a perspective view of a portion of a vehicle in accordance with the present teachings, illustrating a load floor assembly of a first construction in a first position and a seat assembly in a first deployed position, the load floor assembly having a closeout device of a first construction.
Figure 2:
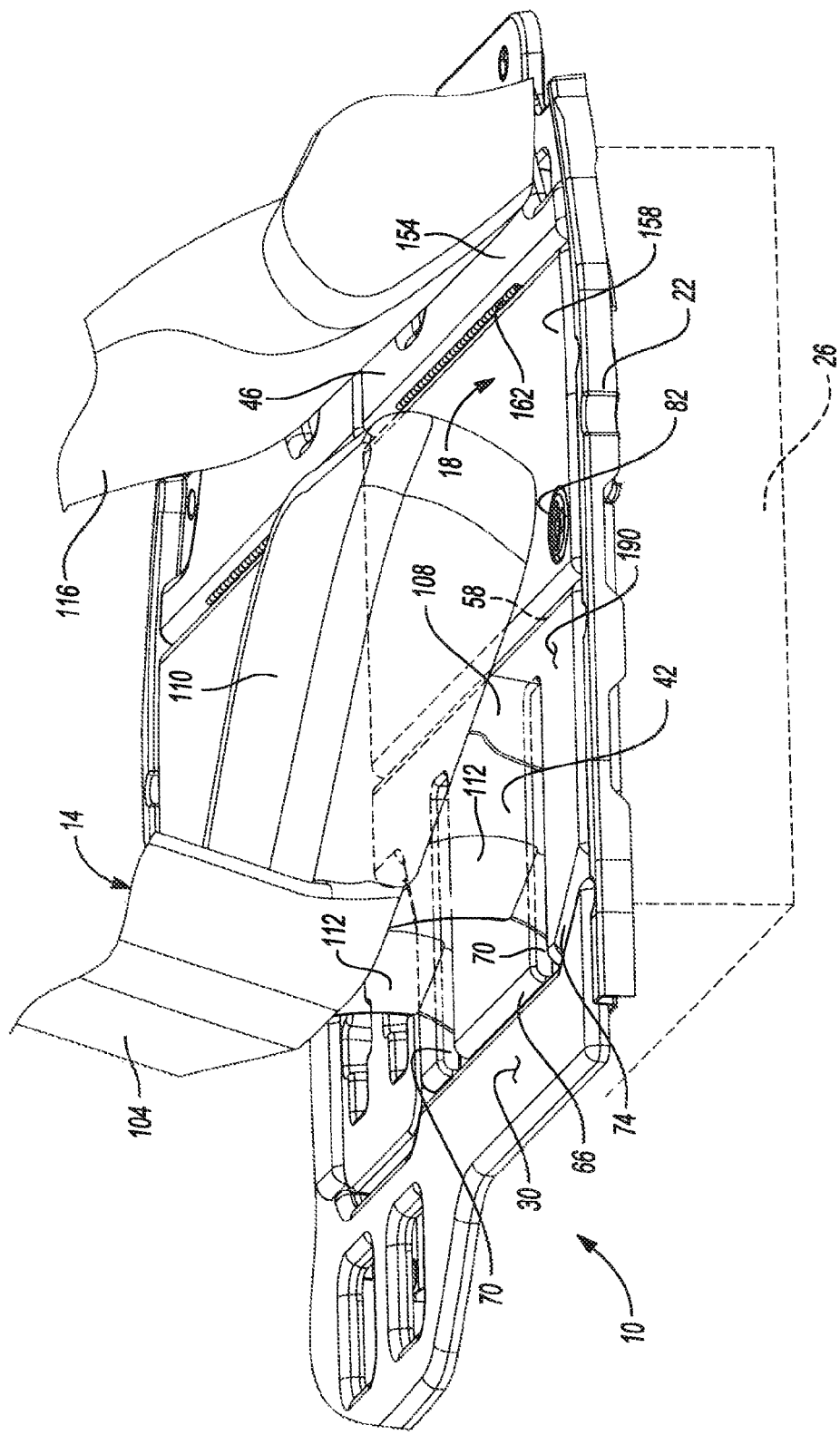
FIG. 2 is a perspective view of a portion of the vehicle of FIG. 1, illustrating the seat assembly in a second deployed position.
Figure 3:
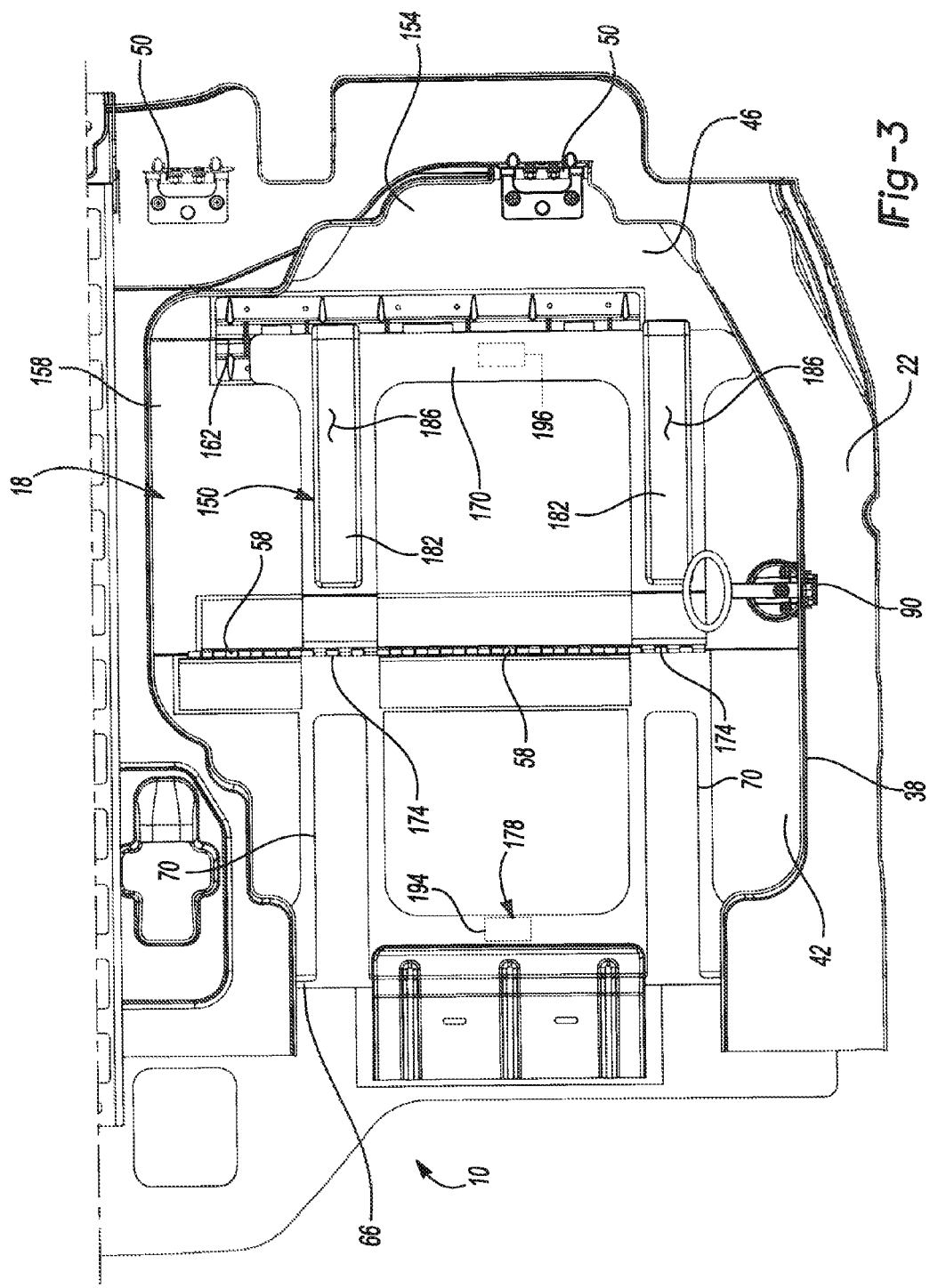
FIG. 3 is a bottom plan view of the load floor assembly of FIG. 1.

With initial reference to FIGS. 1-3, a vehicle floor 10 and a stowable seat assembly 14 of a motor vehicle (not specifically shown) is provided in accordance with the present teachings. The vehicle floor 10 includes a load floor assembly 18, a floor frame 22, and a stowage compartment or tub 26. The floor frame 22 has a top surface 30 and a support lip 34 (shown in FIG. 5) that is recessed below the top surface 30. The floor frame 22 defines a frame aperture 38. The support lip 34 is disposed about the perimeter of the frame aperture 38. The tub 26 is recessed within the vehicle floor 10, below the floor frame 22, and is open to the frame aperture 38 such that the tub 26 can receive the seat assembly 14 when the seat assembly 14 is moved through the frame aperture 38 to a stowed position (shown in FIG. 9). The load floor assembly 18 is configured to cover the tub 26 to conceal the stowed seat assembly 14 and to provide a generally flat vehicle load floor configuration that is generally level with the surrounding floor frame 22.

The load floor assembly 18 includes a first floor panel 42 and a second floor panel 46. The first and second floor panels 42, 46 are configured to be received in the frame aperture 38 and rest upon the support lip 34 to be supported by the support lip 34 and cover the tub 26. One end of the second floor panel 46 is coupled to the floor frame 22 by a first hinge 50 to pivot about the axis of the first hinge 50. An end of the second floor panel 46 that is opposite the first hinge 50 is coupled to the first floor panel 42 by a second hinge 58 (shown in FIG. 3) to pivot about the axis of the second hinge 58. The first floor panel 42 extends from the second hinge 58 to a free end 66. The first floor panel 42 defines a pair of slots 70 that extend through the first floor panel 42 and are generally open at the free end 66.

The free end 66 of the first floor panel 42 may be generally narrower than the end proximate to the second hinge 58. For example, the first floor panel 42 can include a chamfer 74 and/or a cut-out 78 (shown in FIG. 5) at the free end 66 proximate to one or both adjacent sides of the first floor panel 42. The first floor panel 42 and/or the second floor panel 46 can include a pull device 82. The pull device 82 can be any type of device or structure (e.g. a pull ring, or a rigid or flexible strap) such that an operator can grab and move the first and/or second floor panels 42, 46. The pull device 82 can be coupled to a mechanism 90 configured to latch and unlatch with the floor frame 22. The load floor assembly 18 will be discussed in greater detail below.

The seat assembly 14 generally includes a seat portion 110, a back and head portion 104, a set of front legs or risers 108, and a set of rear legs or risers 112. In the example shown, the seat assembly 14 is a second row of seating for the vehicle, which has a first row of seating (e.g. a first row seat 116) generally in front of the seat assembly 14, though other configurations can be used. FIG. 1 illustrates the seat assembly 14 in a first deployed position or a design position and the first and second floor panels 42, 46 of the load floor assembly 18 in the first position.

The front and rear risers 108, 112 are generally coupled to the vehicle floor 10 or a frame (not specifically shown) of the vehicle and configured to support the seat portion 110 above the vehicle floor 10 when the seat assembly 14 is deployed. While illustrated with the seat assembly 14 facing longitudinally toward the first row of seating 116, it is understood that the seat assembly 14 can be positioned to face in other directions, such as laterally within the vehicle or away from the first row of seating 116 for example. The front risers 108 and rear risers 112 are received in the slots 70 to extend through the first floor panel 42 when the seat assembly 14 is deployed. It is understood that the seat assembly 14 can be constructed or oriented in other manners such that only the front risers 108 or only the rear risers 112 are received in the slots 70.

The seat portion 110 is configured to generally support a passenger (not shown) in a conventional manner above the vehicle floor 10 when the seat assembly 14 is in the design position. The back and head portion 104 is configured to generally provide support for the passenger's back and head when the passenger is seated on the seat portion 110.

In the example provided, the seat assembly 14 is moveable between the design position (shown in FIG. 1) and a second deployed position or access position (shown in FIG. 2). When the seat assembly 14 is in the access position, a passageway is provided to an area rearward of the seat assembly 14 for access to cargo and/or ingress/egress to a third row of seating (not shown) behind the seat assembly 14. In addition to being stowable and moveable between the design and access positions, the seat assembly 14 of the present teachings can also include fore-aft adjustment capabilities. It is appreciated that other seat assemblies of the vehicle, in other locations besides a second row, can be constructed in accordance with the present teachings.

With additional reference to FIG. 3, a bottom plan view of a portion of the load floor assembly 18 is illustrated with the first and second floor panels 42, 46 in the first position. In addition to the first and second floor panels 42, 46, the load floor assembly 18 also includes a closeout device 150. The second floor panel 46 may also be subdivided into a first panel member 154 and a second panel member 158. In the example provided, first panel member 154 is coupled to the floor frame 22 by the first hinge 50, and to the second panel member 158 by a third hinge 162 (shown in FIG. 1) to pivot about the axis of the third hinge 162. The third hinge 162 can be configured to be selectively locked, such as to prevent the first panel member 154 from pivoting relative to the second panel member 158 about the third hinge 162. In this example, the second panel member 158 is coupled to the first floor panel 42 by the second hinge 58 opposite the third hinge 162. The first floor panel 42 may extend from the second hinge 58 to the free end 66 a length that is greater than the length of the second panel member 158 (i.e. between the second and third hinges 58, 162).

The closeout device 150 includes a closeout panel 170, a fourth hinge 174, and a latching mechanism 178. The fourth hinge 174 couples the closeout panel 170 to the first and/or second floor panel 42, 46 for rotation relative to the first and second floor panels 42, 46 about the fourth hinge 174. The fourth hinge 174 can be positioned such that the closeout panel 170 pivots about the same axis as the second hinge 58 (i.e. the fourth hinge 174 can be coaxial with the second hinge 58).

The closeout panel 170 includes a pair of closeout members 182. The closeout members 182 can be fixedly coupled together such that the closeout members 182 pivot about the fourth hinge 174 together between a first closeout position (shown in FIGS. 3-5) and a second closeout position (shown in FIGS. 10 and 11). Each closeout member 182 is a generally elongated body that has a shape similar to the slots 70 of the first floor panel 42. Each closeout member 182 is configured to be received in a corresponding one of the slots 70 to fill the corresponding slot 70 when in the second closeout position. The closeout members 182 can be configured such that a top surface 186 of each closeout member 182 is generally level with a top surface 190 (shown in FIGS. 10 and 11) of the first floor panel 42 when in the second closeout position.

Figure 4:
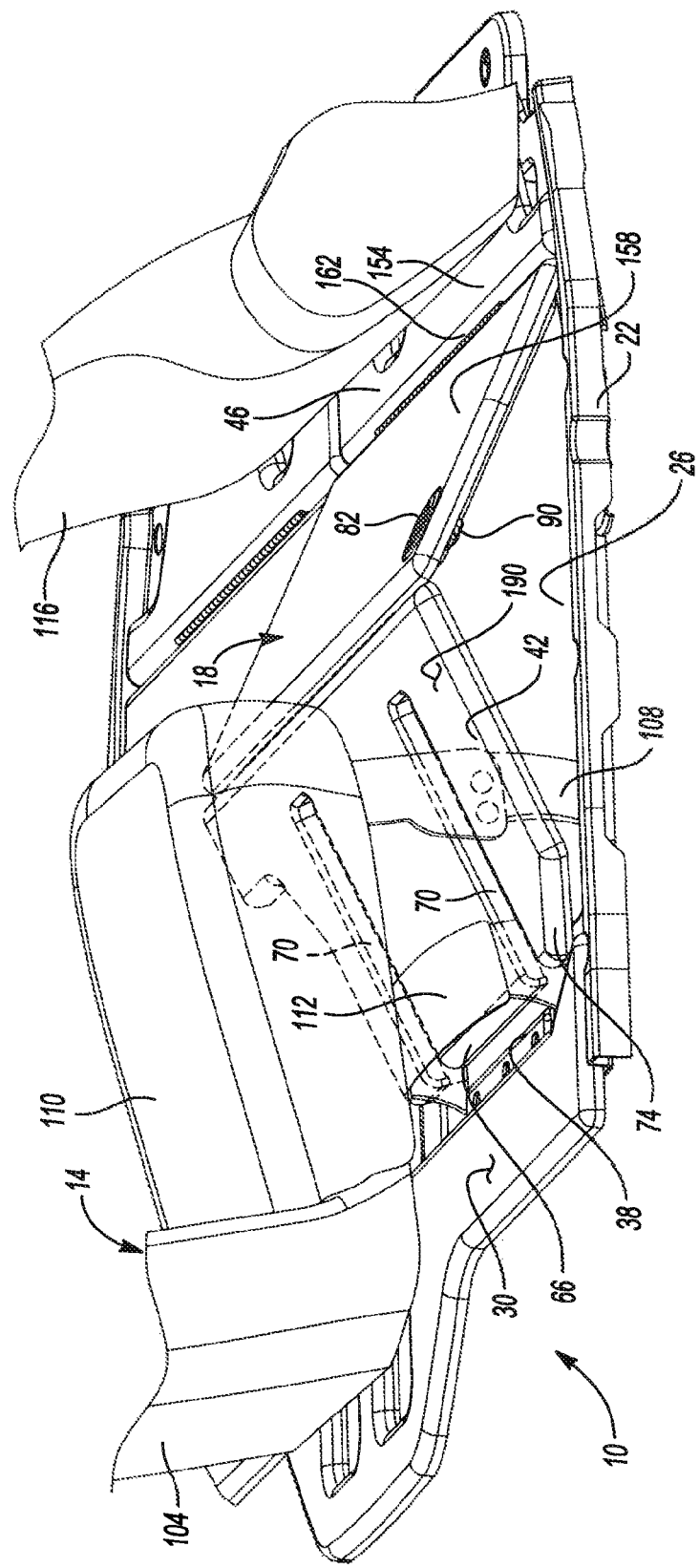
FIG. 4 is a perspective view of a portion of the vehicle of FIG. 1, illustrating the load floor assembly in a second position.

The latching mechanism 178 can be any suitable mechanism for latching or coupling the closeout panel 170 to the first floor panel 42 for common movement therewith when in the second closeout position (shown in FIGS. 10 and 11), and for latching the closeout panel 170 to the second floor panel 46 for common movement therewith when in the first closeout position (shown in FIGS. 3-5). In the example provided, the latching mechanism 178 includes a first magnet 194, and a second magnet 196. The first magnet 194 is fixedly coupled to the first floor panel 42. The second magnet 196 is fixedly coupled to the second floor panel 46. A portion of the closeout panel 170 is configured to be magnetically attracted to the first and second magnets 194, 196. For example, the portion of the closeout panel 170 can include a third magnet (not shown) or can be a ferromagnetic material (e.g. steel). It is understood that the latching mechanism 178 can include additional magnets and/or ferromagnetic portions. It is understood that the magnets and ferromagnetic portions of the latching mechanism 178 can be arranged in other configurations, such as a magnet(s) being disposed on the closeout panel 170 and ferromagnetic portions being on the first and second floor panels 42, 46 for example. It is also understood that the latching mechanism 178 can be constructed in other ways, such as with mechanical latches or clasps for example.

With additional reference to FIGS. 1, and 4-11, operation of the load floor assembly 18 will be described in greater detail. As described above, FIG. 1 illustrates the seat assembly 14 in the design position and the load floor assembly 18 in a first position. In this position, the seat assembly 14 is free to be adjusted fore-aft or moved to the access position (FIG. 2). The first row seat 116 is generally free to be moved fore-aft between a forward position (shown in solid lines in FIG. 1) wherein the first row seat 116 is completely forward of the second floor panel 46, and a rearward position (shown in dashed lines in FIG. 1) wherein the first row seat 116 is at least partially over the second panel (e.g. over the first panel member 154).

With specific reference to FIGS. 4-6, the tub 26 can be accessed to store cargo without the need to articulate the entire load floor assembly 18. An operator can move the first floor panel 42 and the second panel member 158 (e.g. by unlocking the third hinge 162 and operating the pull device(s) 82) while the first panel member 154 remains stationary relative to the floor frame 22.

In moving the load floor assembly 18 from the first position (shown in FIG. 1) to a second position (shown in FIG. 4), the second panel member 158 pivots upwards about the third hinge 162 and the first floor panel 42 pivots downward about the second hinge 58 to avoid the seat assembly 14. In moving the load floor assembly 18 from the second position (shown in FIG. 4) to a third position (shown in FIG. 5), the first floor panel 42 is pulled away from the seat assembly 14 and the risers 108, 112 have exited the slots 70 through the open free end 66. As shown in FIG. 5, since the first floor panel 42 in the example provided is longer than the second panel member 158, the narrower free end 66 of the first floor panel 42 can be received partially through the frame aperture 38 when the first floor panel 42 is pivoted from the third position (shown in FIG. 5) to a fourth position (shown in FIG. 6).

FIG. 6, illustrates the load floor assembly 18 in the fourth position, in which the first panel member 154 is generally flush with the floor frame 22, the second panel member 158 is positioned at an angle relative to the first panel member 154, and the first floor panel 42 is generally folded against the second panel member 158 such that their respective bottoms oppose one another and the closeout members 182 are received in the slots 70. The load floor assembly 18 can be returned to the first position (shown in FIG. 1) by reversing the operations. In this way, the load floor assembly 18 of the present disclosure allows for access to the cargo in the tub 26 when the first row seat 116 is in the rearward position (i.e. covering a portion of the first panel member 154 and the first hinge 50) and without the need to articulate the entire load floor assembly 18.

With specific reference to FIGS. 7-11, the load floor assembly 18 can be articulated to permit the seat assembly 14 to be stowed in the tub 26 with the closeout members 182 filling the slots 70 and the load floor assembly 18 covering the stowed seat assembly 14. In moving the load floor assembly 18 from the first position (shown in FIG. 1) to a fifth position (shown in FIG. 7), the first row seat 116 can be in the forward position and the operator can move the first floor panel 42 with the entire second floor panel 46 (e.g. by locking the third hinge 162 and operating the pull device(s) 82) such that the second floor panel 46 pivots upward about the first hinge 50 and the first floor panel 42 pivots downward about the second hinge 58 to avoid the seat assembly 14. The first and second floor panels 42, 46 can be moved to the fifth position (shown in FIG. 7) with the back and head portion 104 of the seat assembly 14 folded over the seat portion 110, while still avoiding the seat assembly 14. In moving the load floor assembly 18 from the fifth position (shown in FIG. 7) to a sixth position (shown in FIG. 8), the first floor panel 42 is pulled away from the seat assembly 14 and the risers 108, 112 have exited the slots 70 through the open free end 66.

Figure 9:
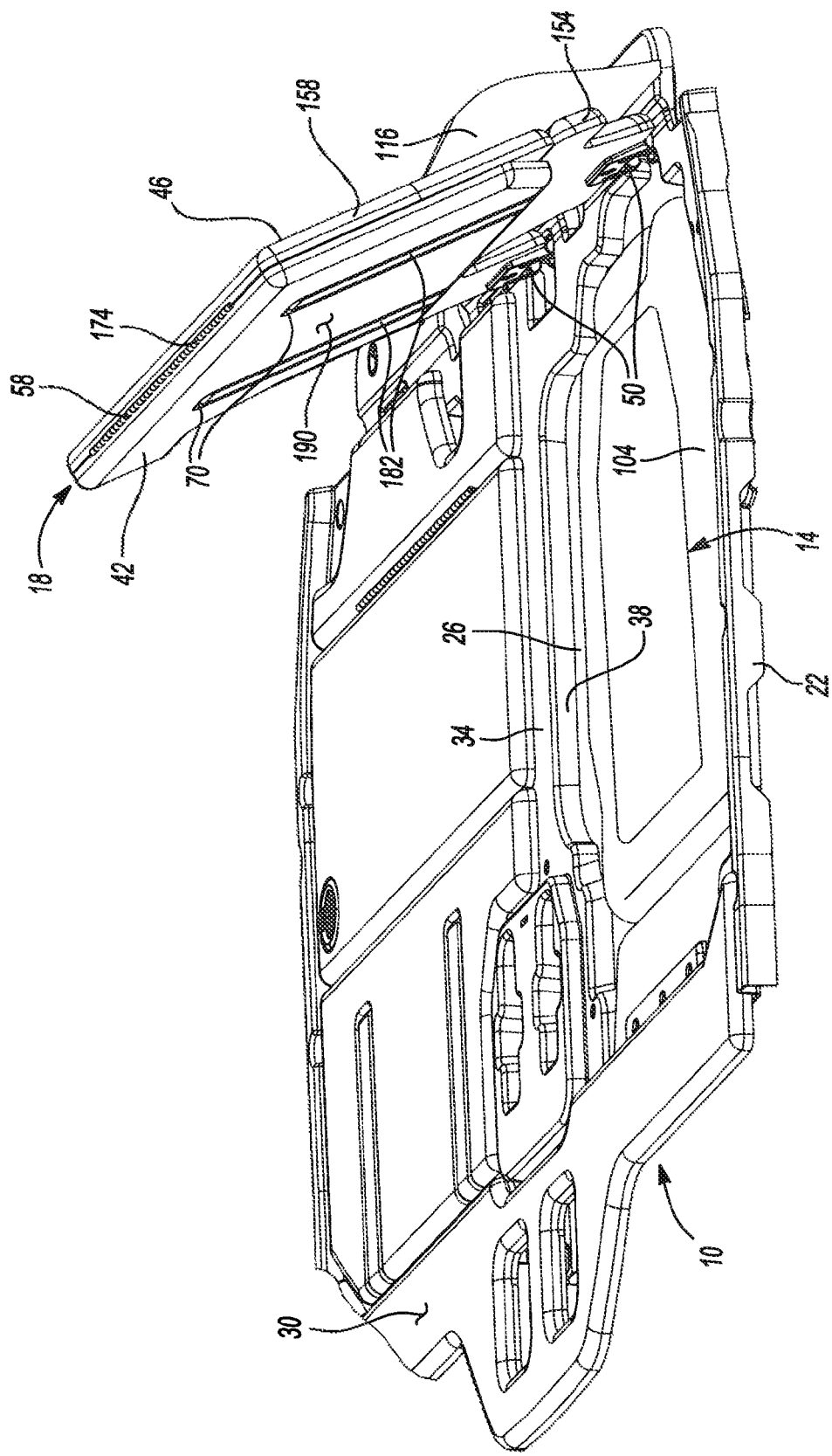
FIG. 9 is a perspective view of a portion of the vehicle of FIG. 1, illustrating the load floor assembly in a seventh position and the seat assembly in a stowed position.

The load floor assembly 18 can then be moved from the sixth position (shown in FIG. 8) to a seventh position (shown in FIG. 9). In the seventh position (shown in FIG. 9), the first floor panel 42 is generally folded against the second floor panel 46 such that their respective bottoms oppose one another and the closeout members 182 are received in the slots 70. In this position, the back and head portion 104 of the seat assembly 14 can be folded over the seat portion 110 and the seat assembly 14 can be lowered into the tub 26 to be in the stowed position as shown.

Figure 10:
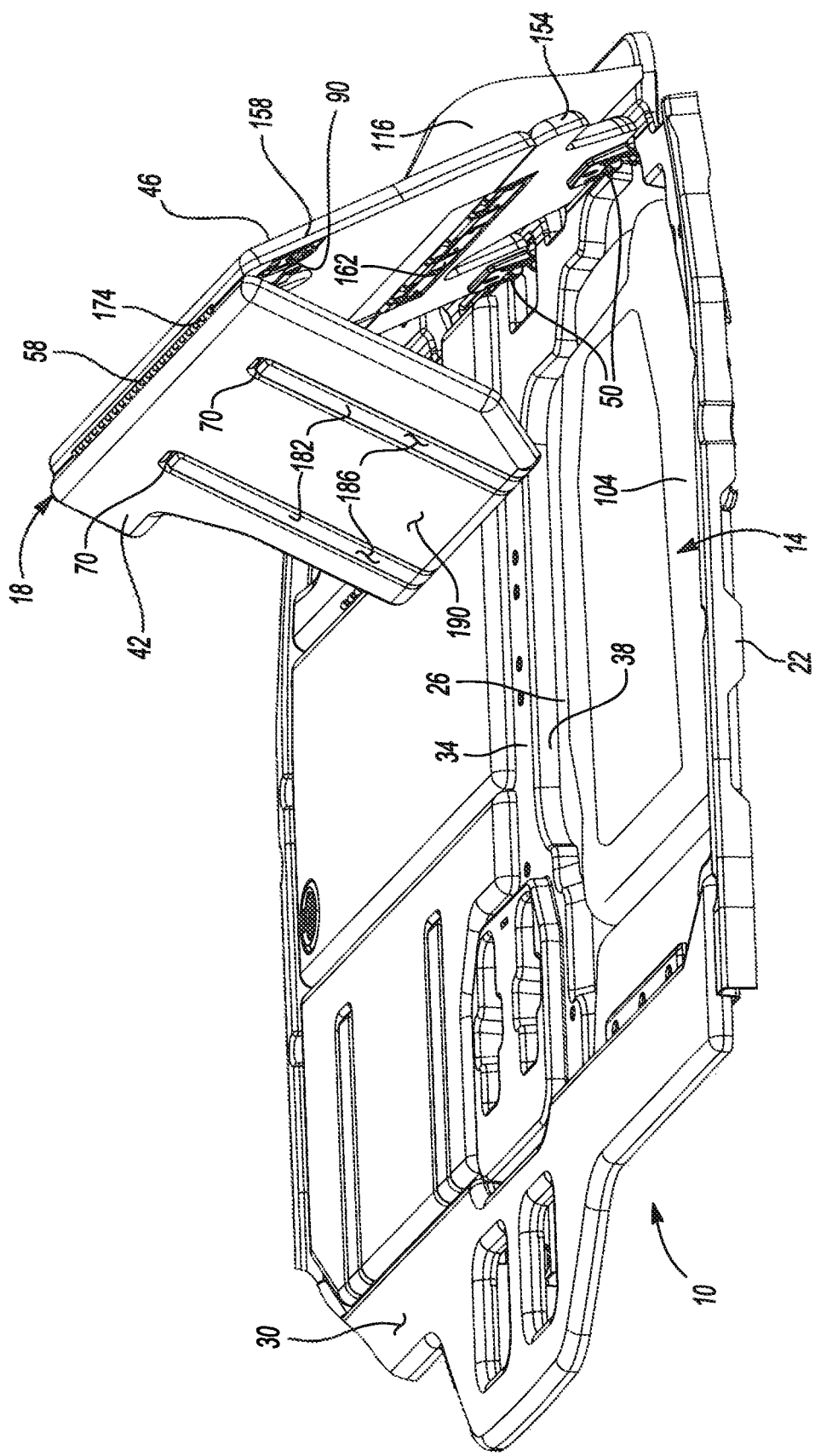
FIG. 10 is a perspective view of a portion of the vehicle of FIG. 1, illustrating the load floor assembly in an eighth position.
Figure 11:
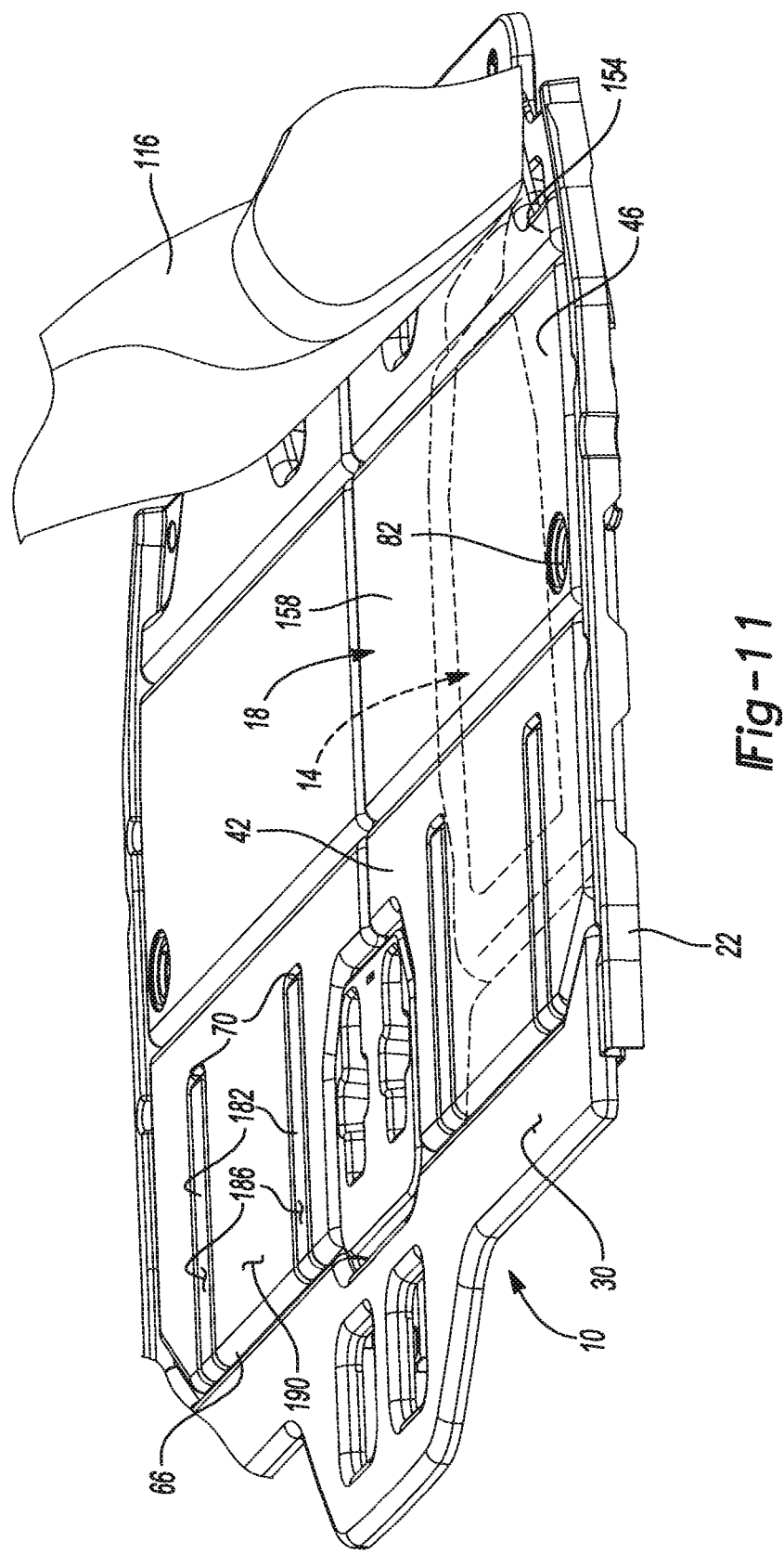
FIG. 11 is a perspective view similar to FIG. 9, illustrating the load floor assembly in a ninth position.

With the seat assembly 14 stowed, the load floor assembly 18 can be moved from the seventh position (shown in FIG. 9) to an eighth position (shown in FIG. 10). In the eighth position (shown in FIG. 10), or a suitable similar position, the operator can unlatch the latching mechanism 178. With the closeout panel 170 unlatched from the second floor panel 46, the operator can pivot the closeout panel 170 from the first closeout position to the second closeout position and latch the closeout panel 170 to the first floor panel 42, as shown in FIG. 10. With the closeout panel 170 latched for motion with the first floor panel 42, the load floor assembly 18 can be moved from the eighth position (shown in FIG. 10) to a ninth position (shown in FIG. 11). The ninth position is generally the same as the first position (shown in FIG. 1), but with the closeout members 182 received in the slots 70. The seat can be re-deployed by reversing the operations.

Figure 12:
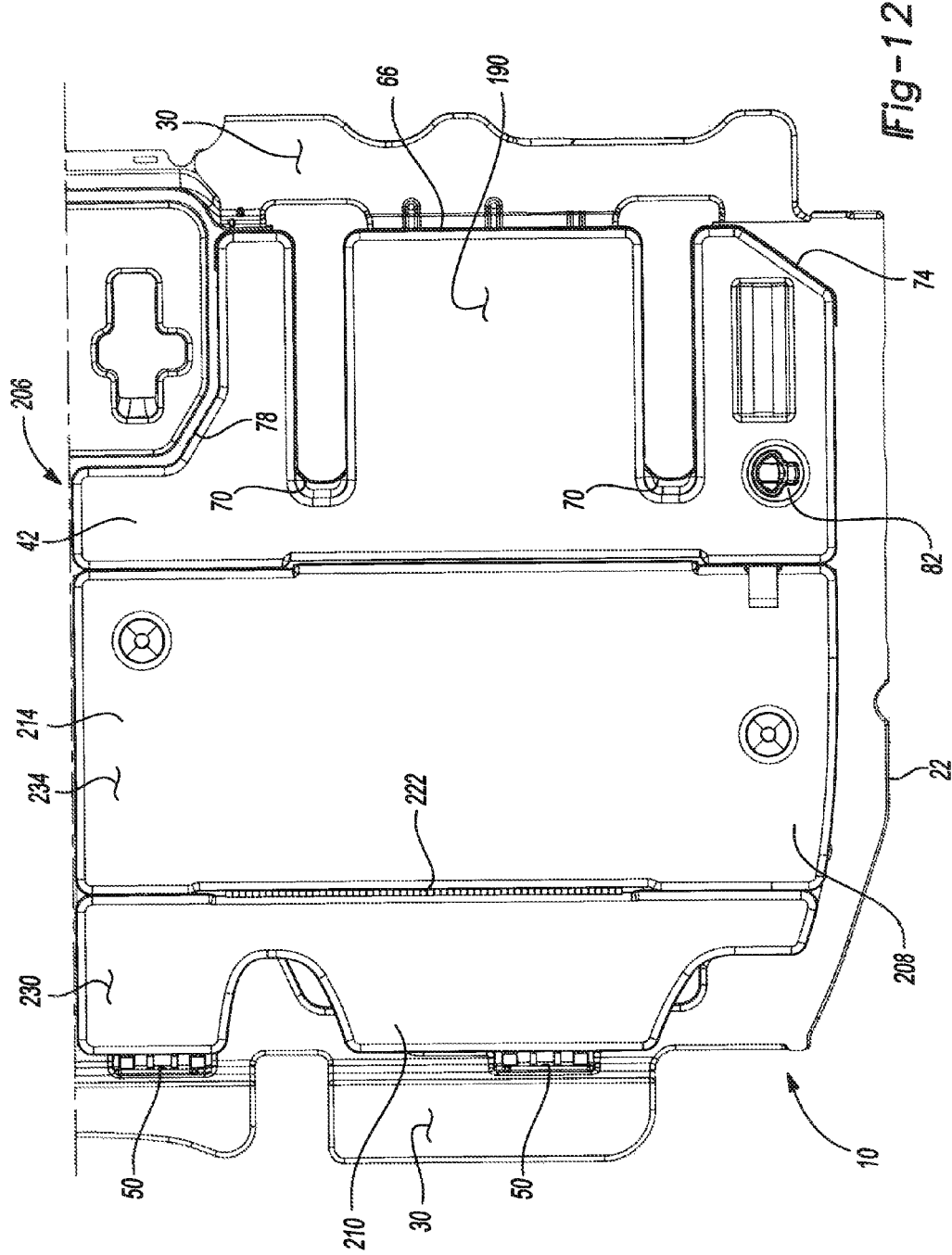
FIG. 12 is a top plan view of a load floor assembly of a second construction and in a first position in accordance with the present teachings.
Figure 13:
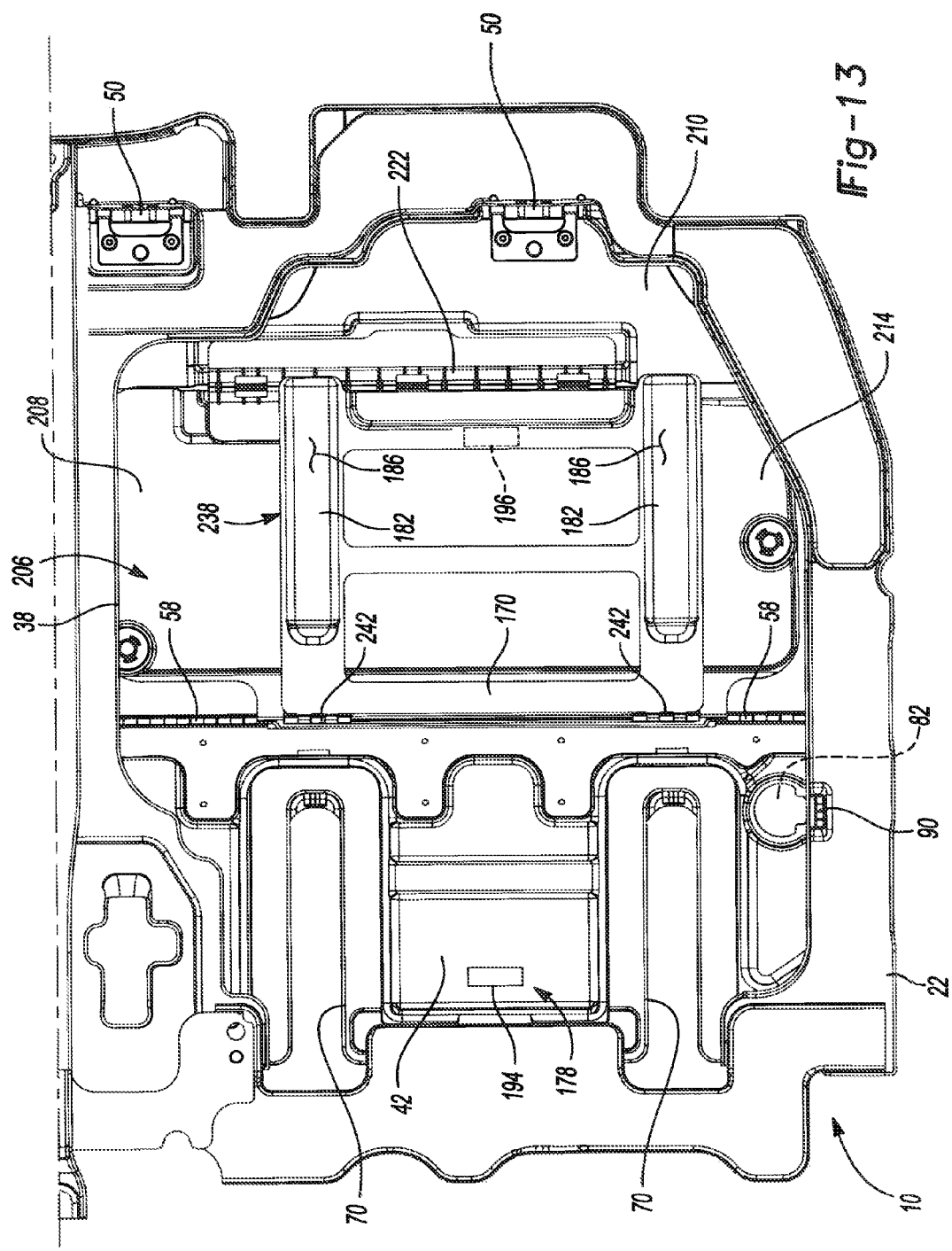
FIG. 13 is a bottom plan view of the load floor assembly of FIG. 12.
Figure 14:
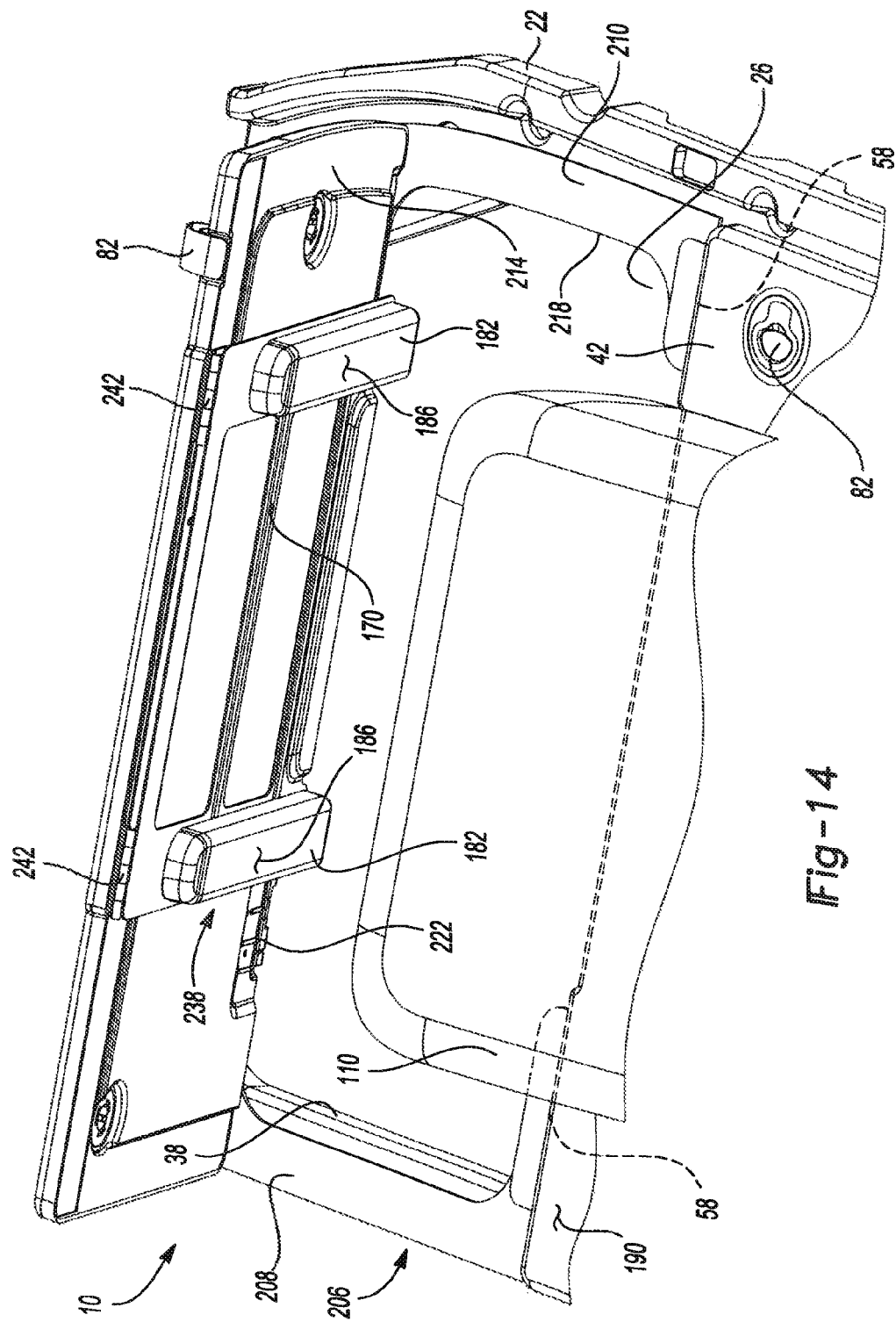
FIG. 14 is a perspective view of a portion of the load floor assembly of FIG. 12 in a second position.

With reference to FIGS. 12-18, a load floor assembly 206 of a second construction is illustrated. The load floor assembly 206 is similar to the load floor assembly 18, with the exceptions shown in FIGS. 12-18 and described herein. FIG. 12 is a top plan view of the load floor assembly 206 in the first position. FIG. 13 is a bottom plan view of the load floor assembly 206 in the first position. In this construction, the load floor assembly 206 includes the first floor panel 42 and a second floor panel 208.

The second floor panel 208 can be similar to the second floor panel 46 except as shown and described herein. The second floor panel 208 is subdivided into a first panel member 210 and a second panel member 214. The first panel member 210 is coupled to the floor frame 22 by the first hinge 50 to pivot about the axis of the first hinge 50, and the first panel member 210 extends outward therefrom to the second hinge 58. The second hinge 58 couples the first panel member 210 to the first floor panel 42 such that the first panel member 210 and the first floor panel 42 can pivot about the axis of the second hinge 58.

The first panel member 210 defines a convenience aperture 218 that is located above the tub 26 when the load floor assembly 206 is in the first position. The second panel member 214 is coupled to the first panel member 210 by a third hinge 222 at a location between the first and second hinges 50, 58 to pivot about the axis of the third hinge between a closed position (shown in FIGS. 12 and 13) and an open position (shown in FIG. 14). The third hinge 222 may optionally be configured to lock to prevent the first panel member 210 from pivoting relative to the second panel member 214 about the axis of the third hinge 222.

The second panel member 214 is generally disposed above the convenience aperture 218 to cover the convenience aperture 218 when in the closed position (shown in FIGS. 12 and 13). The second panel member 214 is configured to overlap with the portion of the first panel member 210 that forms the perimeter of the convenience aperture 218, such that the first panel member 210 can support the second panel member 214 above the tub 26. A portion of the first panel member 210, that is between the first and third hinges 50, 222, can have a top surface 230 that is generally level with a top surface 234 of the second panel member 214 and the top surface 190 of the first floor panel 42 when in the closed position.

The load floor assembly 206 includes a closeout device 238 that is similar to the closeout device 150, except as illustrated in FIGS. 12-18 and described herein. The closeout device 238 includes the closeout panel 170, a fourth hinge 242, and the latching mechanism 178. The closeout panel 170 is coupled to the second panel member 214 by the fourth hinge 242 to pivot relative to the second panel member 214 about the axis of the fourth hinge 242. The axis of the fourth hinge 242 is coaxial with the axis of the second hinge 58 when the second panel member 214 is in the closed position. With specific reference to FIG. 16, the first and second floor panels 42, 208 are illustrated pivoted about the second hinge 58. In the example provided, the fourth hinge 242 is located in a central portion of the second panel member 214 and the second hinge 58 includes two hinge portions spaced apart. Thus when the second panel member 214 is in the closed position, the fourth hinge 242 is disposed coaxially between the two hinge portions of the second hinge 58, though other coaxial configurations can be used.

Operation of the load floor assembly 206 is similar to operation of the load floor assembly 18, with the exceptions described below. FIGS. 12 and 13 illustrate the load floor assembly 206 in a first position with the second panel member 214 in the closed position. In order to access cargo stored in the tub 26, an operator can move the load floor assembly 206 to a second position by pivoting the second panel member 214 from the closed position to the open position (shown in FIG. 14; e.g. by operating the second pull device 82) while the first floor panel 42 and the first panel member 210 remain stationary relative to the floor frame 22. In this way, the tub 26 can be accessed when the seat assembly 14 is deployed without articulating the entire load floor assembly 206. When access to cargo in the tub 26 is no longer needed, the operator can return the second panel member 214 to the closed position to cover the convenience aperture 218 to permit passengers to walk on the second panel member 214.

Figure 15:
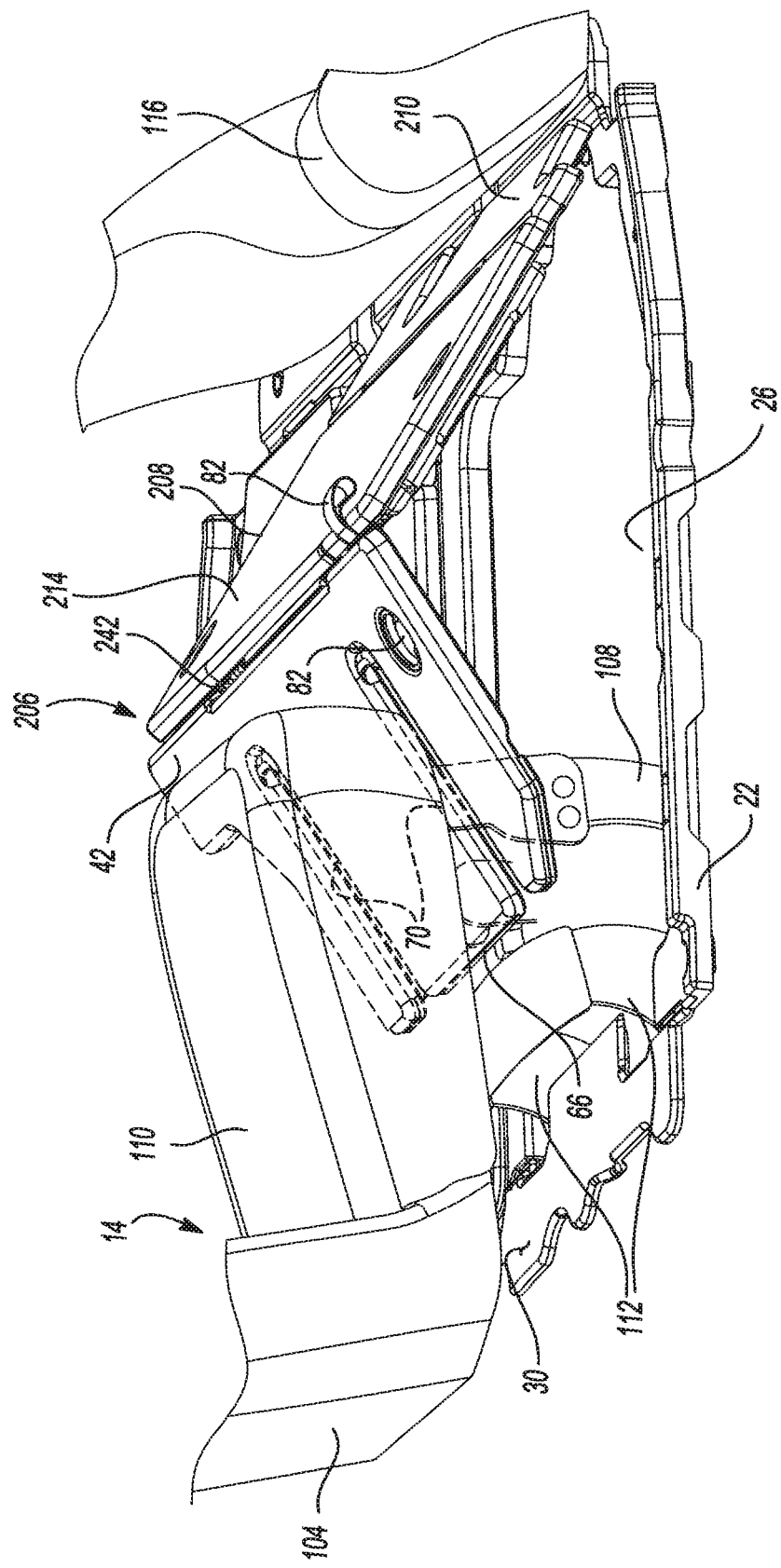
FIG. 15 is a perspective view of a portion of the load floor assembly of FIG. 12 in a third position.
Figure 16:
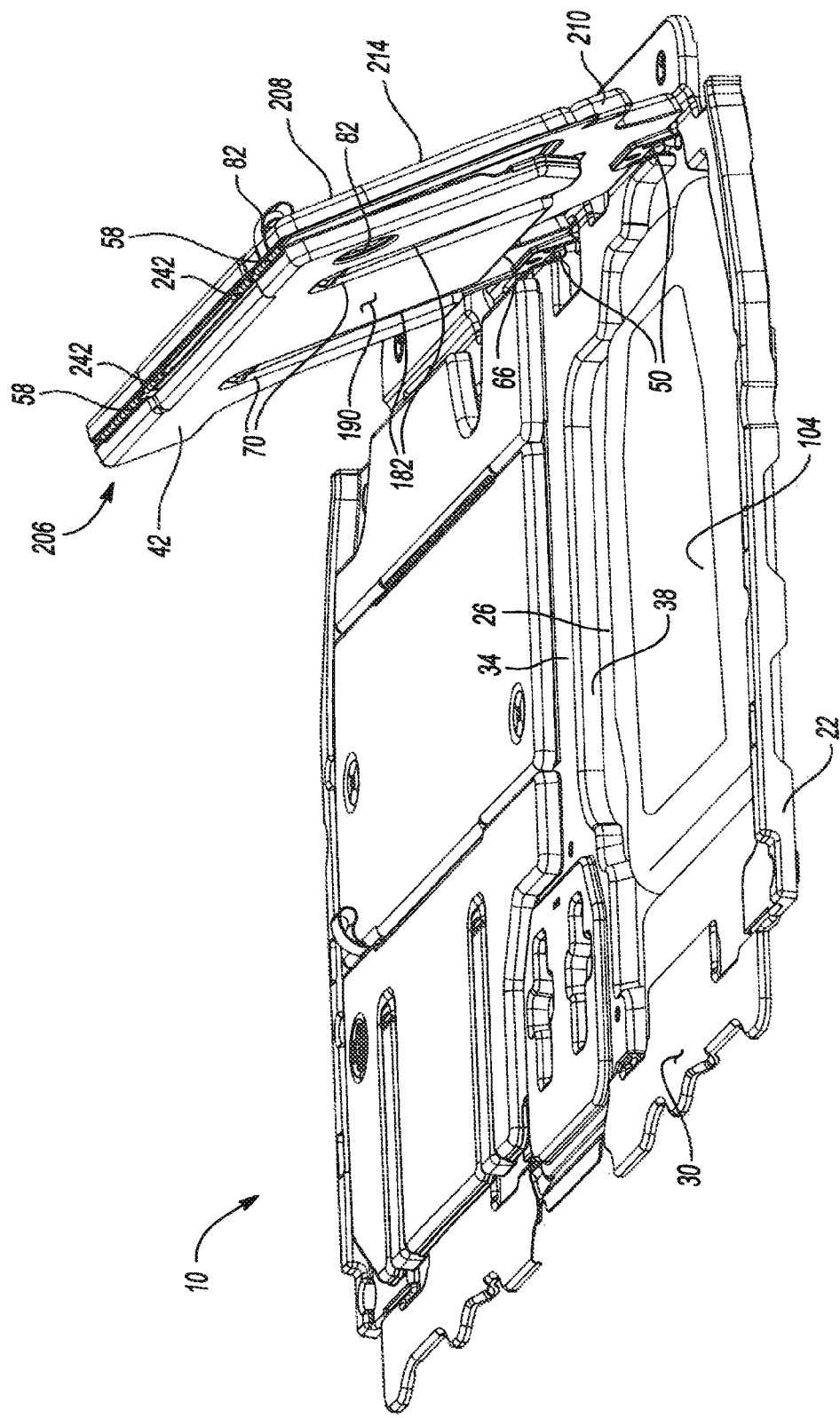
FIG. 16 is a perspective view similar to FIG. 15, illustrating the load floor assembly in a fourth position and a seat assembly in a stowed position.

To stow the seat assembly 14 in the tub 26, the operator can move the load floor assembly 206 to a third position (shown in FIG. 15). In moving the load floor assembly from the first position (shown in FIG. 12) to the third position (shown in FIG. 15), the first row seat 116 can be in the forward position and the operator can move the first floor panel 42 with the second floor panel 208 such that the second floor panel 208 can pivot upward about the first hinge 50 and the first floor panel 42 can pivot downward about the second hinge 58 to avoid the seat assembly 14. In moving the load floor assembly 18 from the third position (shown in FIG. 15) to a fourth position (shown in FIG. 16), the first floor panel 42 is pulled away from the seat assembly 14 and the risers 108, 112 have exited the slots 70 through the open free end 66. In the fourth position (shown in FIG. 16), the first floor panel 42 is generally folded against the second floor panel 208 such that their respective bottoms oppose one another and the closeout members 182 are received in the slots 70. In this position, the back and head portion 104 of the seat assembly 14 can be folded over the seat portion 110 and the seat assembly 14 can be lowered into the tub 26 to be in the stowed position as shown.

Figure 17:
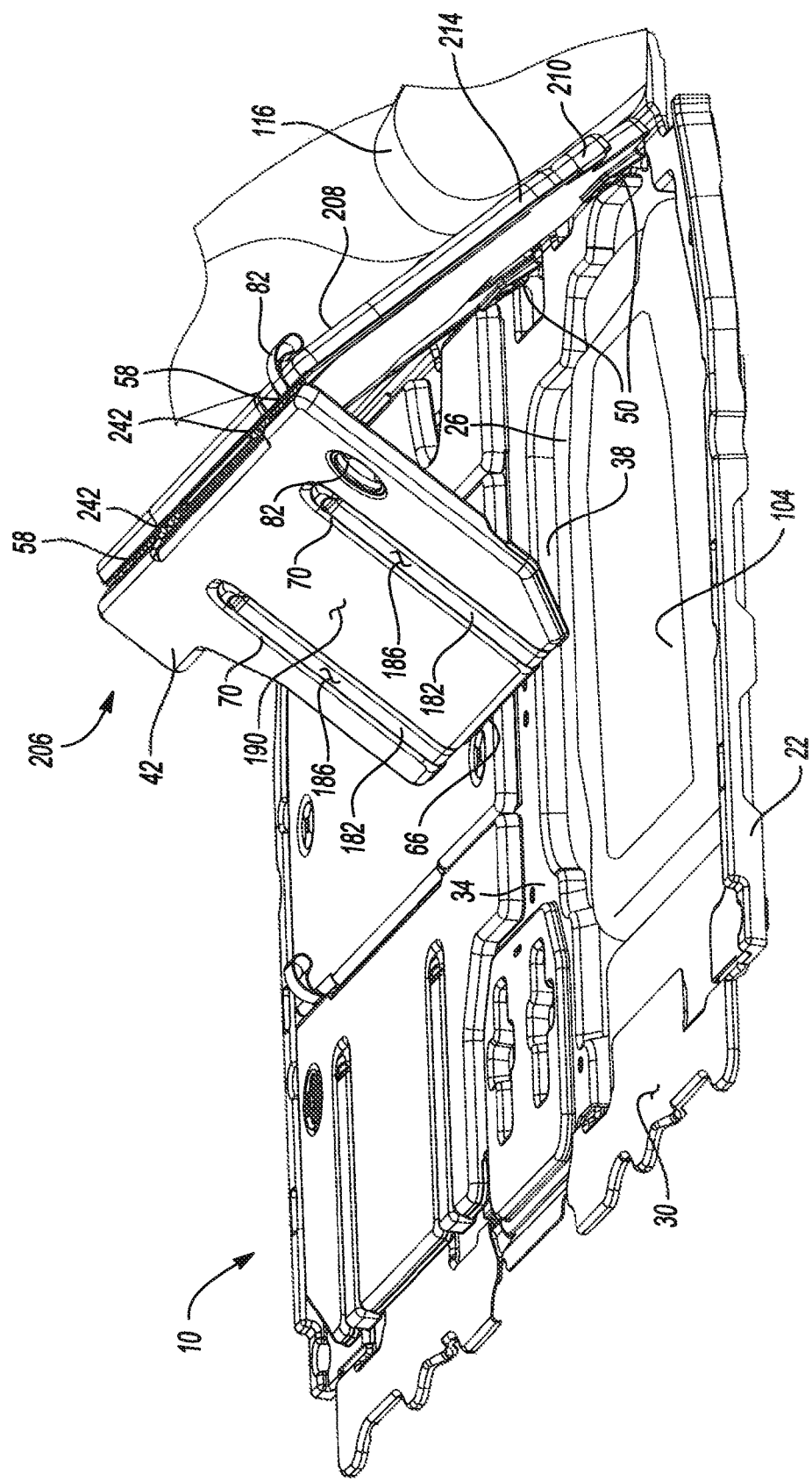
FIG. 17 is a perspective view similar to FIG. 16, illustrating the load floor assembly in a fifth position.

With the seat assembly 14 stowed, the load floor assembly 206 can be moved from the fourth position (shown in FIG. 16) to the fifth position (shown in FIG. 17). In the fifth position (shown in FIG. 17), or a suitable similar position, the operator can operate the latching mechanism 178 to unlatch the closeout panel 170 from the second floor panel 208. With the closeout panel 170 unlatched from the second floor panel 208, the operator can pivot the closeout panel 170 from the first closeout position to the second closeout position and latch the closeout panel 170 to the first floor panel 42, as shown in FIG. 17.

Figure 18:
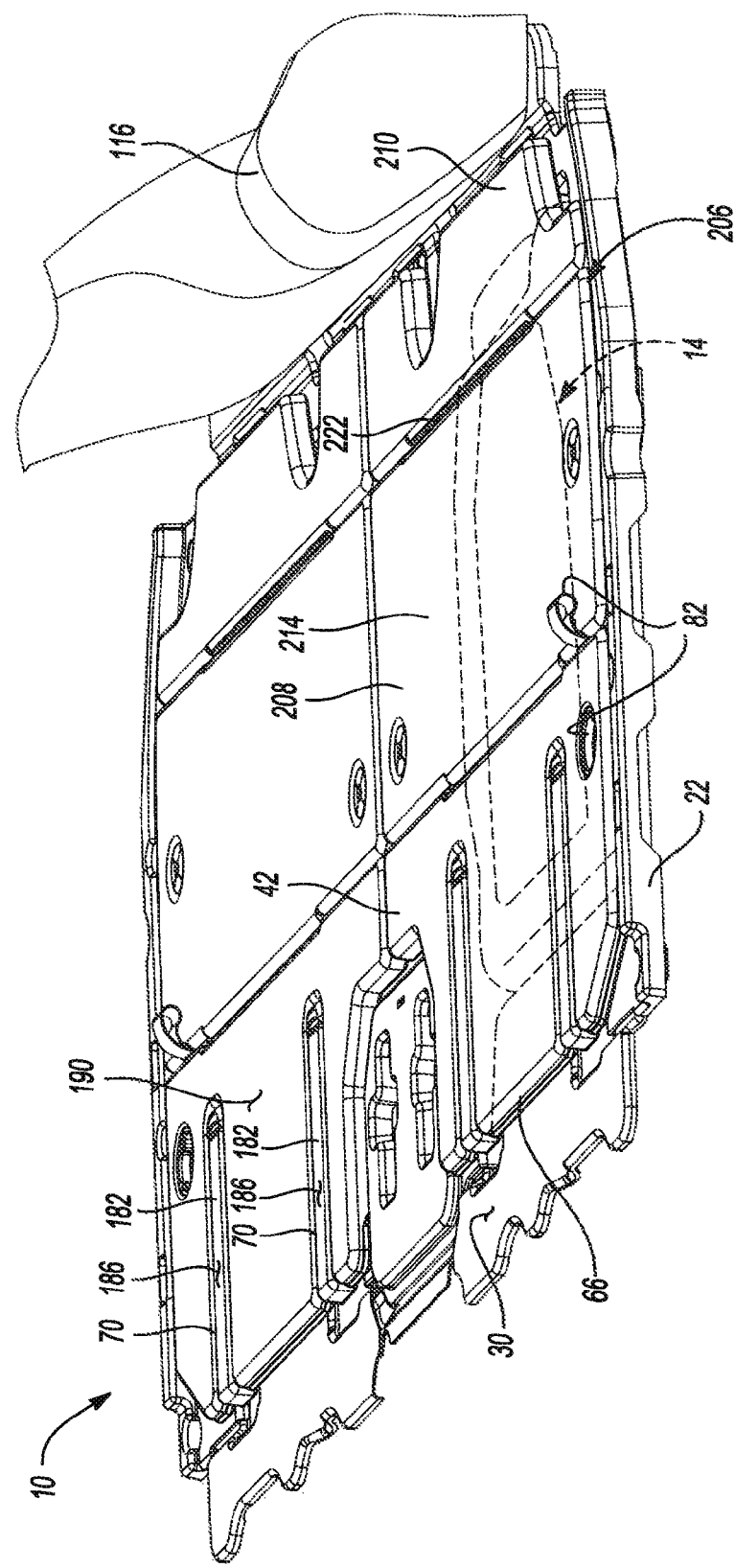
FIG. 18 is a perspective view similar to FIG. 16, illustrating the load floor assembly in a sixth position.

With the closeout panel 170 latched for motion with the first floor panel 42, the load floor assembly 206 can be moved from the fifth position (shown in FIG. 17) to a sixth position (shown in FIG. 18). The sixth position is generally the same as the first position (shown in FIG. 12), but with the closeout members 182 received in the slots 70. In the sixth position (shown in FIG. 18), the second panel member 214 can be prevented from being moved to the open position, because the second panel member 214 is operatively coupled to the closeout members 182. The seat can be re-deployed by reversing the operations.

Figure 19:
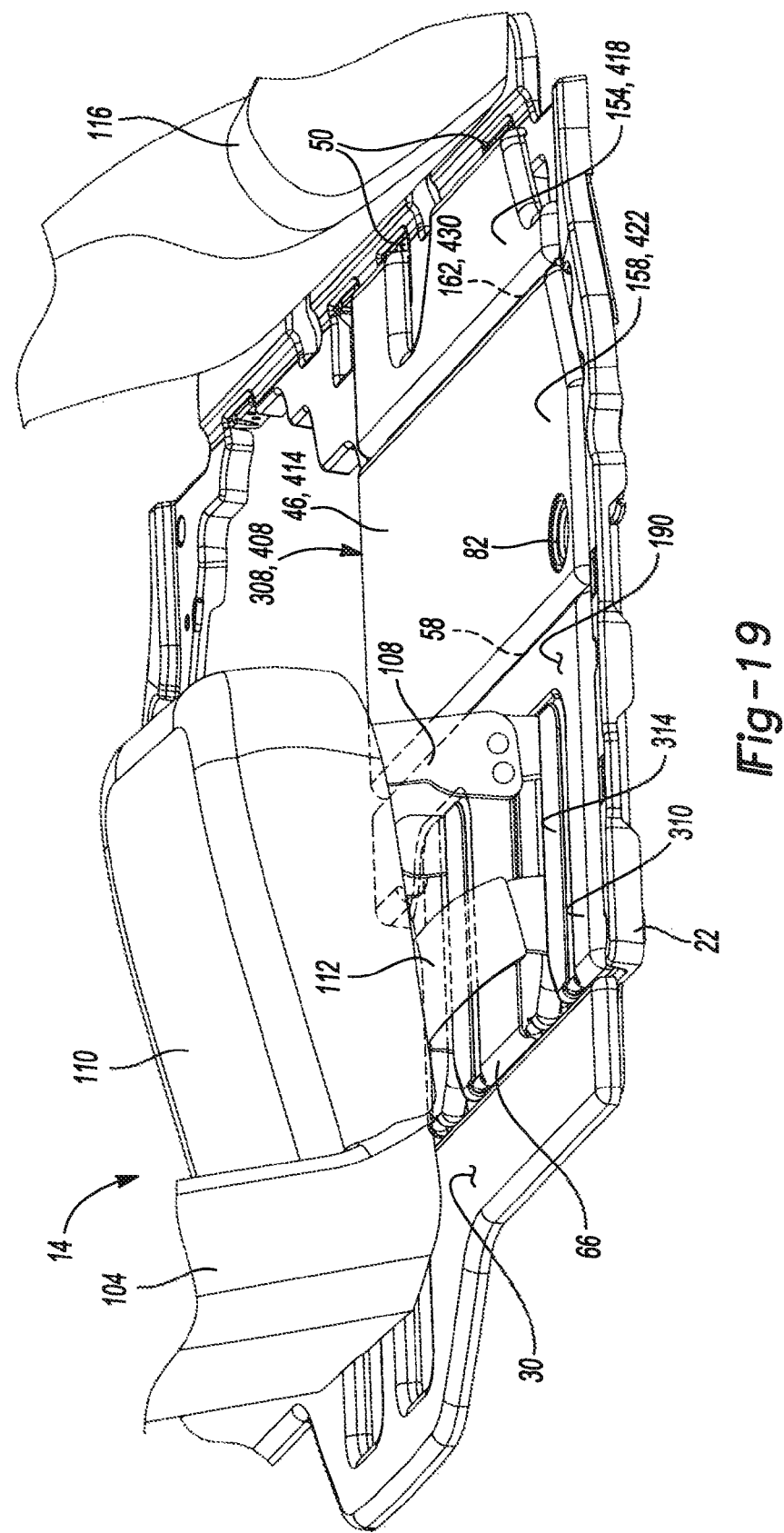
FIG. 19 is a perspective view of a load floor assembly of a third construction and in a first position in accordance with the present teachings.

With additional reference to FIGS. 19-22, a load floor assembly 308 of a third construction is illustrated. The load floor assembly 308 is similar to the load floor assembly 18, with the exceptions shown in FIGS. 19-22 and described herein. FIG. 19 illustrates the load floor assembly 308 in a first position with the seat assembly 14 in the design position. The load floor assembly 308 includes a first floor panel 310, the second floor panel 46, and a pair of closeout devices 314. The first floor panel 310 is similar to the first floor panel 42, except as shown and described herein. The second floor panel 46 includes the first panel member 154 and the second panel member 158 which can be constructed as described above with reference to load floor assembly 18, to be articulated similar to that shown and described herein with reference to FIGS. 4-6. Thus the first panel member 154 can remain stationary relative to the floor frame 22, while the second panel member 158 pivots upward about the third hinge 162 and the first floor panel 310 pivots downward about the second hinge 58 to avoid the seat assembly 14 to permit access to cargo within the tub 26.

Figure 20:
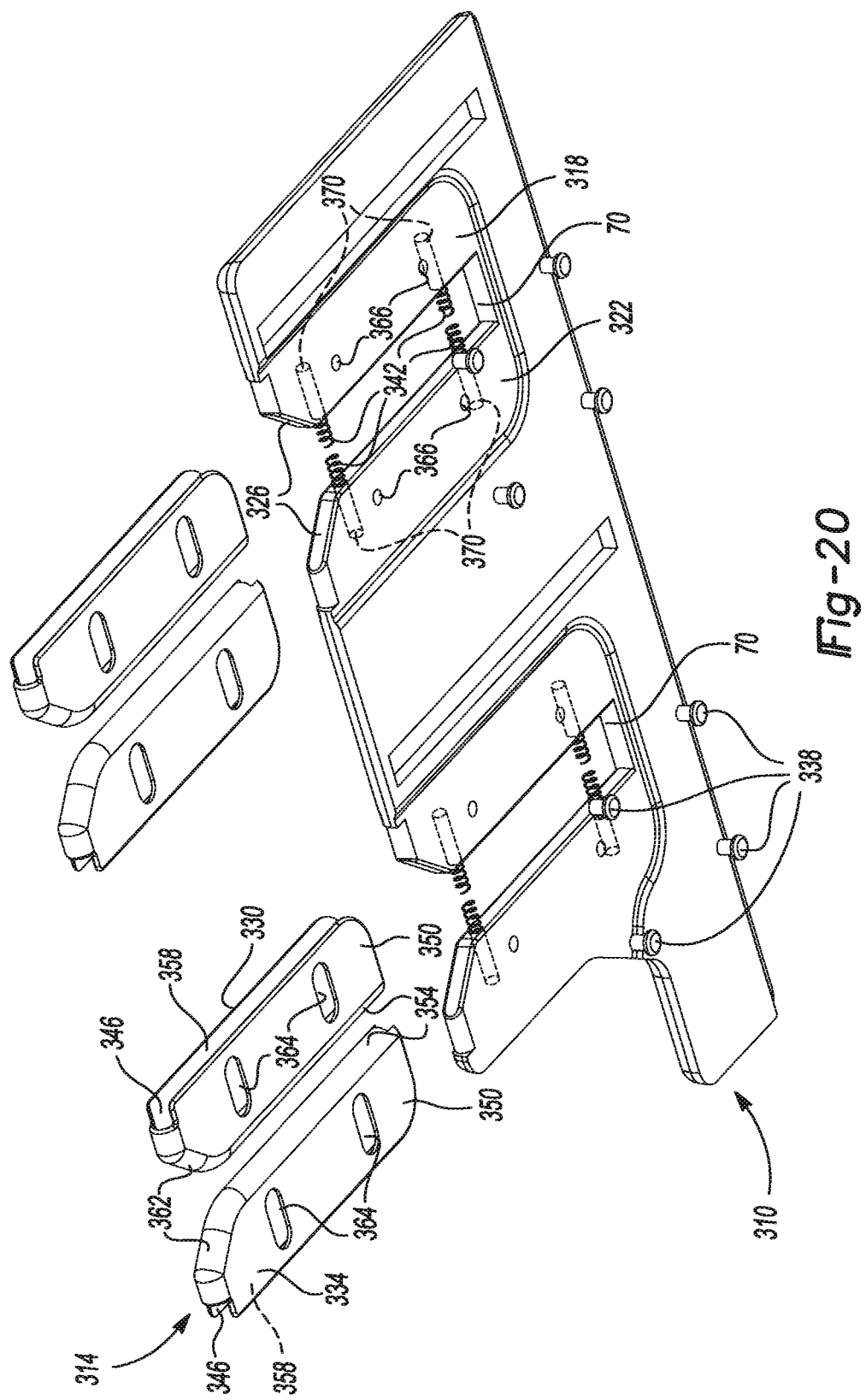
FIG. 20 is an exploded view of a portion of the load floor assembly of FIG. 19.
Figure 21:
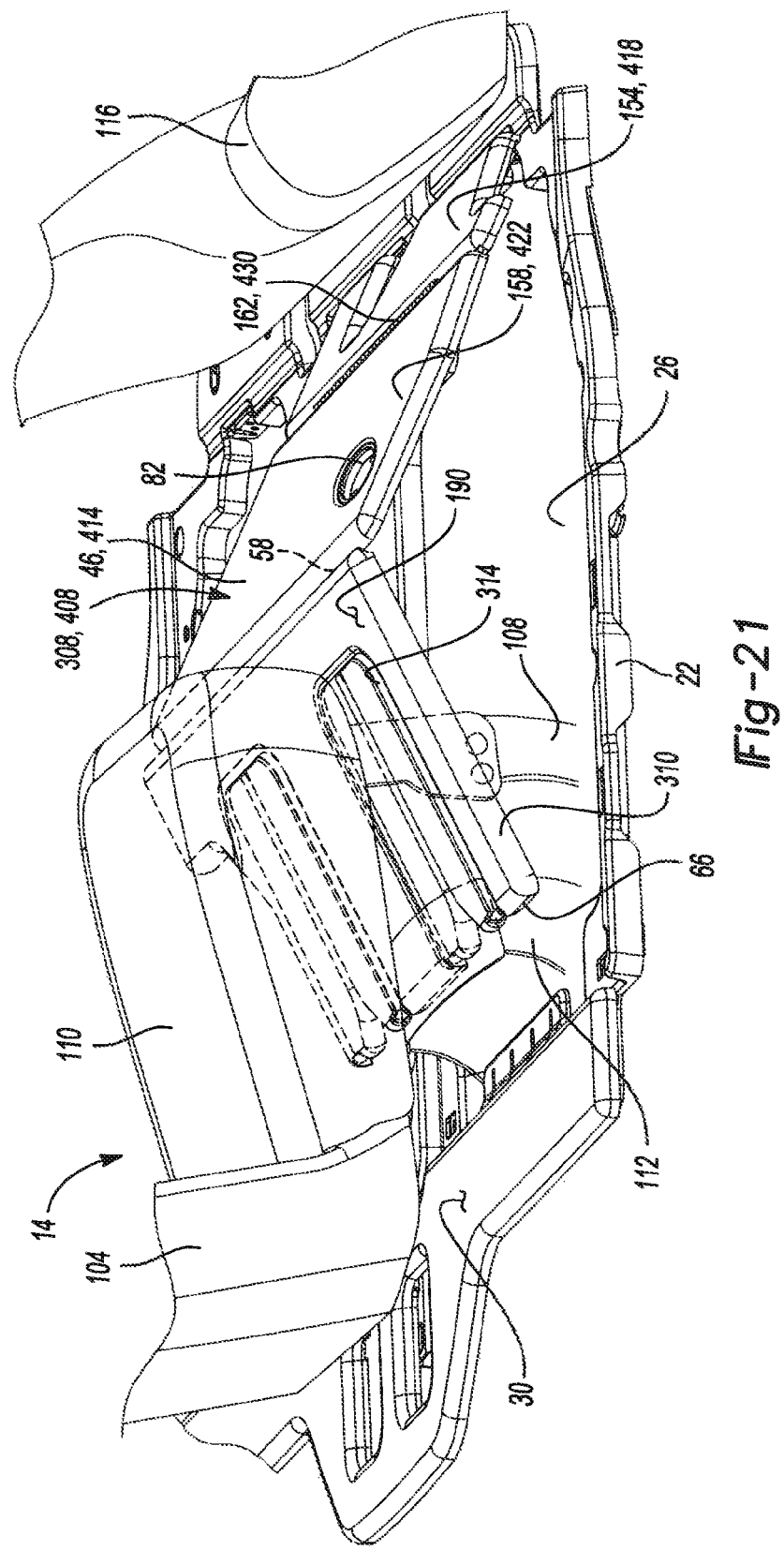
FIG. 21 is a perspective view of the load floor of FIG. 19, illustrating the load floor assembly in a second position and a seat assembly in a first deployed position.

With specific reference to FIG. 20, an exploded perspective view of the first floor panel 310 and the closeout devices 314 are illustrated. The first floor panel 310 includes a first pair of guide members 318 and a second pair of guide members 322 that define the pair of slots 70 that are open to the free end 66 of the first floor panel 310. The guide members 318, 322 extend from opposite sides of each slot 70 and are recessed relative to the top surface 190 of the first floor panel 310. The guide members 318, 322 include a chamfered or curved surface 326 proximate to the free end 66 of the first floor panel 310 such that the slots 70 widen at the free end 66.

The closeout devices 314 include a first pair of closeout members 330, a second pair of closeout members 334, guide pins 338, and biasing members 342. Each closeout member 330, 334 has a top wall 346 and a bottom wall 350 that are spaced apart and generally parallel to each other. The top and bottom walls 346, 350 are joined on one side by a side wall 354, such that the top, bottom, and side walls 346, 350, 354 define a cavity 358 that is open on a side of the closeout member 330, 334 that is opposite the side wall 354. One end of the side wall 354 has a chamfer, ramp, or curve 362 to correspond with the chamfered or curved surface 326 of the guide members 318, 322. The top and bottom walls 346, 350 are spaced apart such that one of the guide members 318, 322 can be received in the cavity 358 between the top and bottom walls 346, 350.

In the example provided, the bottom wall 350 defines a pair of elongated apertures 364 that penetrate through the bottom wall 350 and into the cavity 358. One of the guide pins 338 is received in each aperture 364 and secured in first bores 366 defined by a corresponding one of the guide members 318, 322. The guide pins 338 engage the apertures 364 to prevent the closeout members 330, 334 from moving fore-aft (i.e. longitudinal with respect to the slots 70) and limit their range of motion transverse to the slots. The biasing members 342 are disposed between the guide members 318, 322 and a corresponding one of the closeout members 330, 334 to bias the closeout member 330, 334 into the slot 70. In the example provided, the biasing members 342 are coil springs, though other configurations can be used. In the example provided, a pair of the biasing members 342 are received in a pair of second bores 370 defined by the guide members 318, 322. The second bores 370 are open toward the slot 70.

Figure 22:
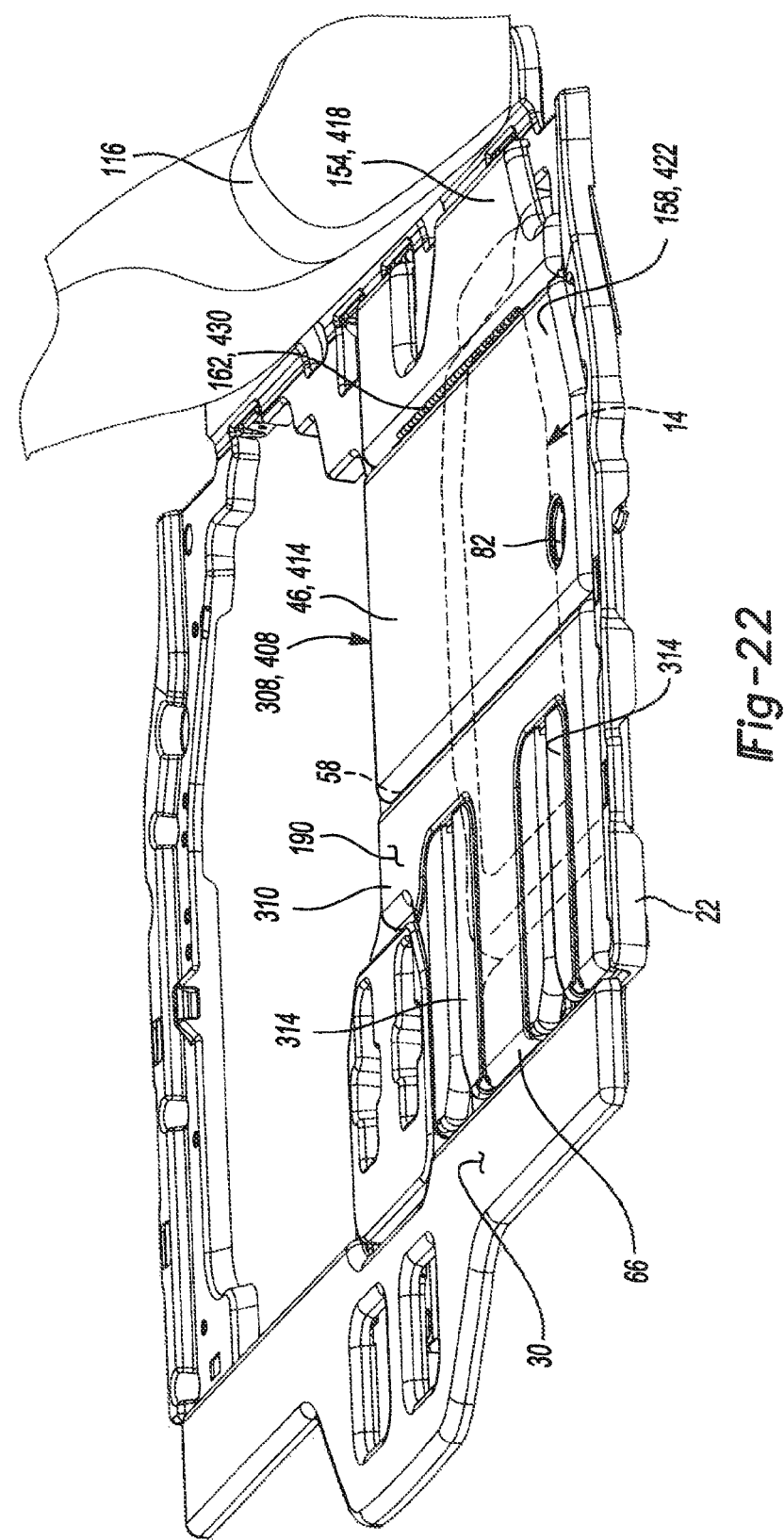
FIG. 22 is a perspective view similar to FIG. 21, illustrating the load floor assembly in the first position and the seat assembly in a stowed position.

In operation, the biasing members 342 bias the closeout members 330, 334 toward each other (e.g. toward a first closeout position shown in FIG. 22). As shown in FIG. 19, when the load floor assembly 308 is in the first position and the seat assembly 14 is deployed, the biasing members 342 can bias the closeout members 330, 334 against the risers 108, 112 to reduce the gaps between the first floor panel 310 and the risers 108, 112.

To stow the seat assembly 14 in the tub 26, the operation is similar to that shown and described with reference to FIGS. 7-11. In general, the first row seat 116 can be in the forward position and the operator can move the first floor panel 310 with the entire second floor panel 46 (e.g. by locking the third hinge 162 and operating the pull device(s) 82) such that the second floor panel 46 can pivot upward about the first hinge 50 and the first floor panel 310 can pivot downward about the second hinge 58 to avoid the seat assembly 14 and pull the first floor panel 310 away from the seat assembly 14 until the risers 108, 112 have exited the slots 70 through the open free end 66. With the seat assembly 14 stowed, the load floor assembly 308 can be moved to the position shown in FIG. 22. As shown in FIG. 22, the biasing members 342 bias the closeout members 330, 334 such that the side wall 354 of the first closeout member 330 contacts the side wall 354 of a corresponding second closeout member 334 to close the slot 70.

Figure 23:
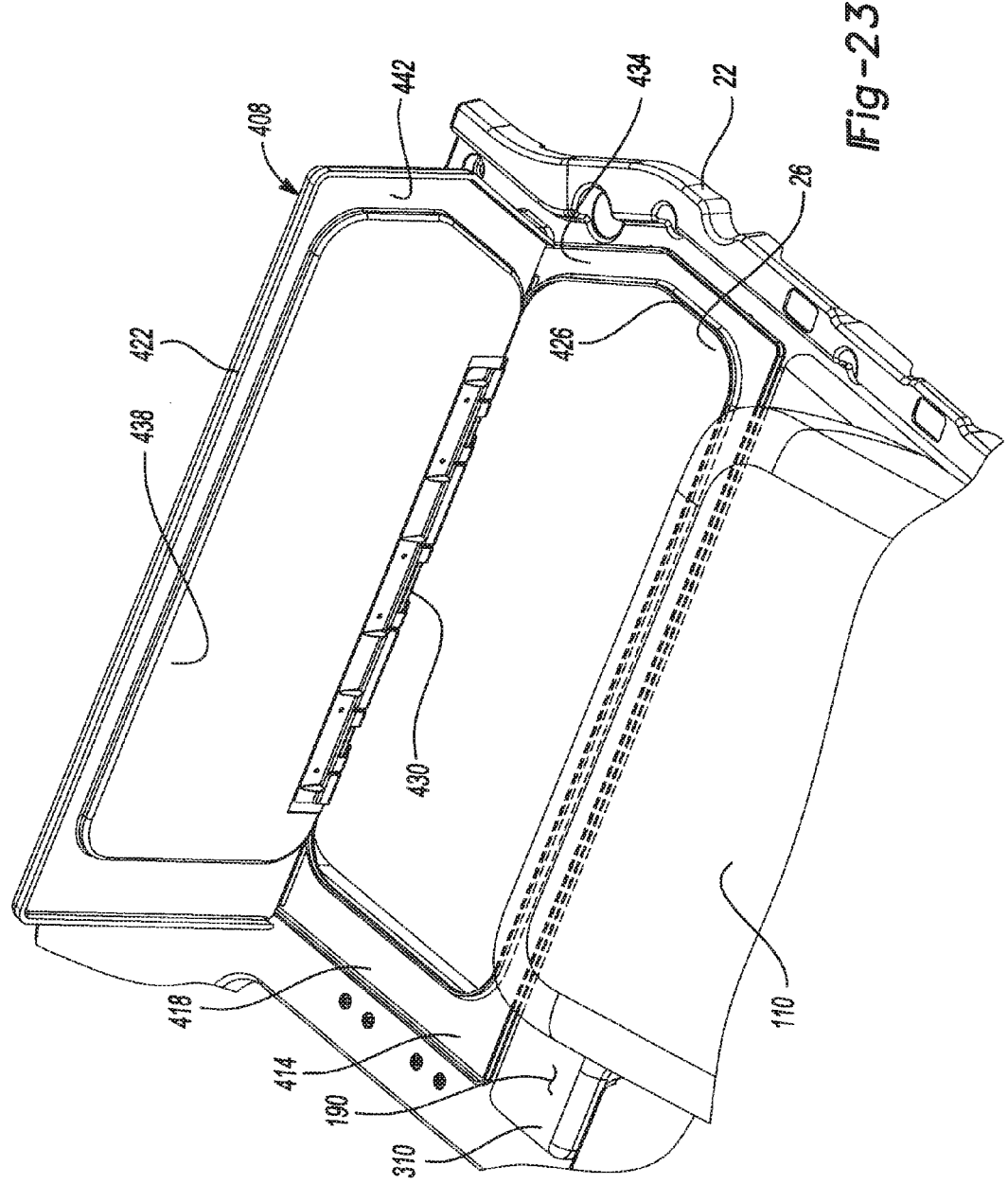
FIG. 23 is a perspective view of a portion of the load floor assembly of FIG. 19, illustrating a convenience door of the load floor assembly in an open position.

With reference to FIGS. 19-22 and additional reference to FIG. 23, a load floor assembly 408 of a fourth construction is illustrated. The load floor assembly 408 can be similar to the load floor assembly 308, except as otherwise shown in FIG. 23 and described herein. The load floor assembly 408 can include the first floor panel 310, a second floor panel 414, and a closeout device (e.g. closeout device 314 shown in FIGS. 19-21). The closeout device and first floor panel 310 can be similar to the closeout device 314 and first floor panel 310, described above and shown in FIGS. 19-21. The second floor panel 414 is constructed similar to the second floor panel 46, described above except as otherwise shown and described herein.

In this construction, the second floor panel 414 is subdivided into a first panel member 418 and a second panel member 422. The first panel member 418 is coupled to the floor frame 22 by the first hinge 50 to pivot about the axis of the first hinge 50, and the first panel member 418 extends outward therefrom to the second hinge 58. The second hinge 58 couples the first panel member 418 to the first floor panel 310 such that the first panel member 418 and the first floor panel 310 can pivot about the axis of the second hinge 58.

The first panel member 418 defines a convenience aperture 426 that is located above the tub 26 when the load floor assembly 408 is in the first position (shown in FIGS. 19, 22, and 23). The second panel member 422 is coupled to the first panel member 418 by a third hinge 430 at a location between the first and second hinges 50, 58 to pivot about the axis of the third hinge 430 between a closed position (shown in FIGS. 19 and 22) and an open position (shown in FIG. 23). The third hinge 430 may optionally be configured to lock the first panel member 418 to the second panel member 422 to prevent the second panel member 422 from opening. The second panel member 422 is generally disposed above the convenience aperture 426 to cover the convenience aperture 426 when in the closed position. The second panel member 422 is configured to overlap with a rim 434 of the first panel member 418 that forms the perimeter of the convenience aperture 426, such that the first panel member 418 can support the second panel member 422 above the tub 26.

In the example provided, the second panel member 422 defines a plateau 438 surrounded by a rim 442. The plateau 438 has a shape similar to the convenience aperture 426 and extends into the convenience aperture 426, while the rim 442 is supported by the rim 434 of the first panel member 418 when the second panel member 422 is in the closed position. A portion of the rim 434 can overlap with the support lip 34 when the second panel member 422 is in the closed position. The portion of the first panel member 418, that is between the first and third hinges 50, 430, can have a top surface that is generally level with the top surface of the second panel member 422 and the top surface of the first floor panel 310 when in the closed position.

Figure 24:
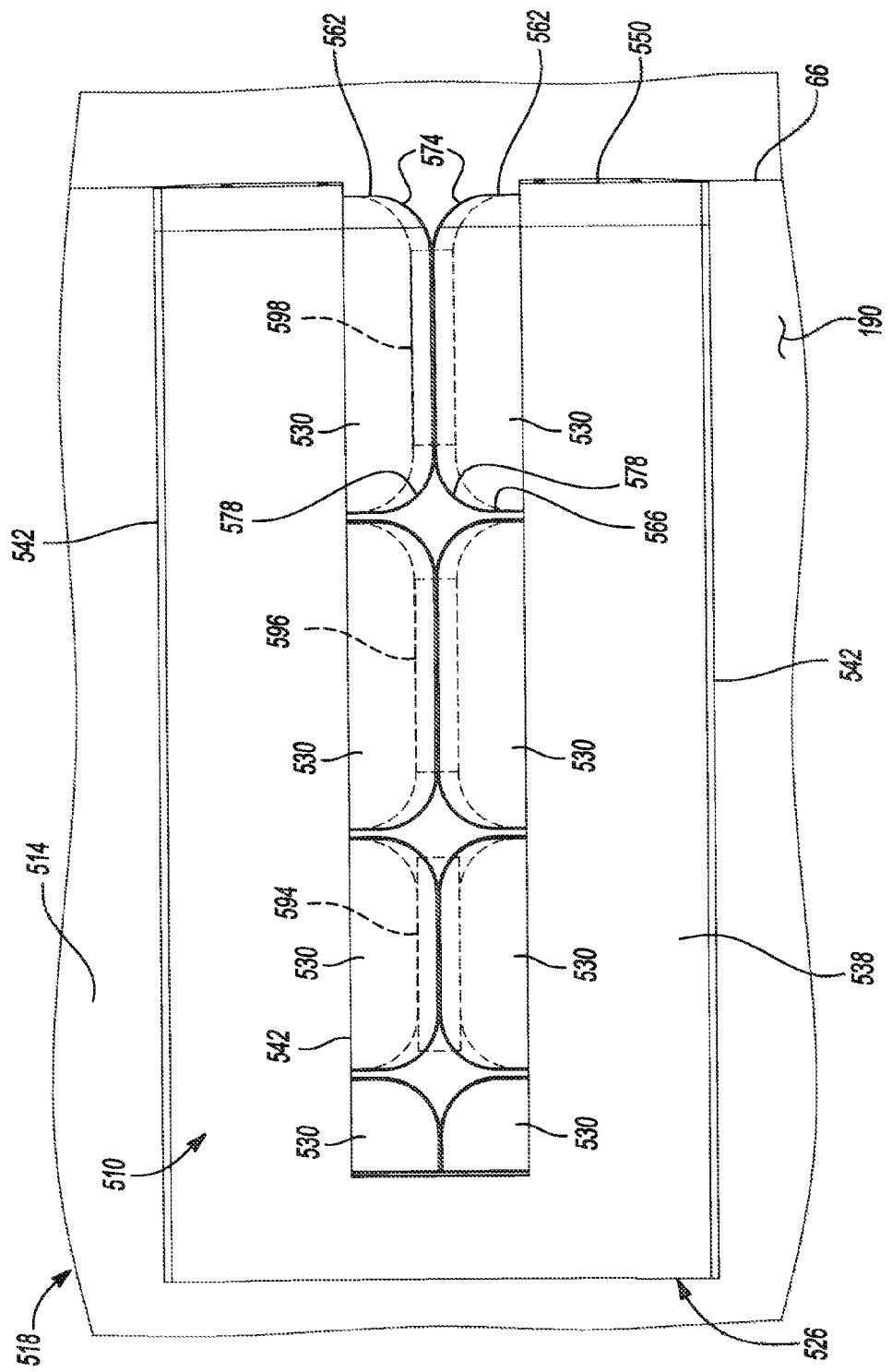
FIG. 24 is a top plan view of a portion of a load floor assembly of a fourth construction in accordance with the present teachings.
Figure 25:
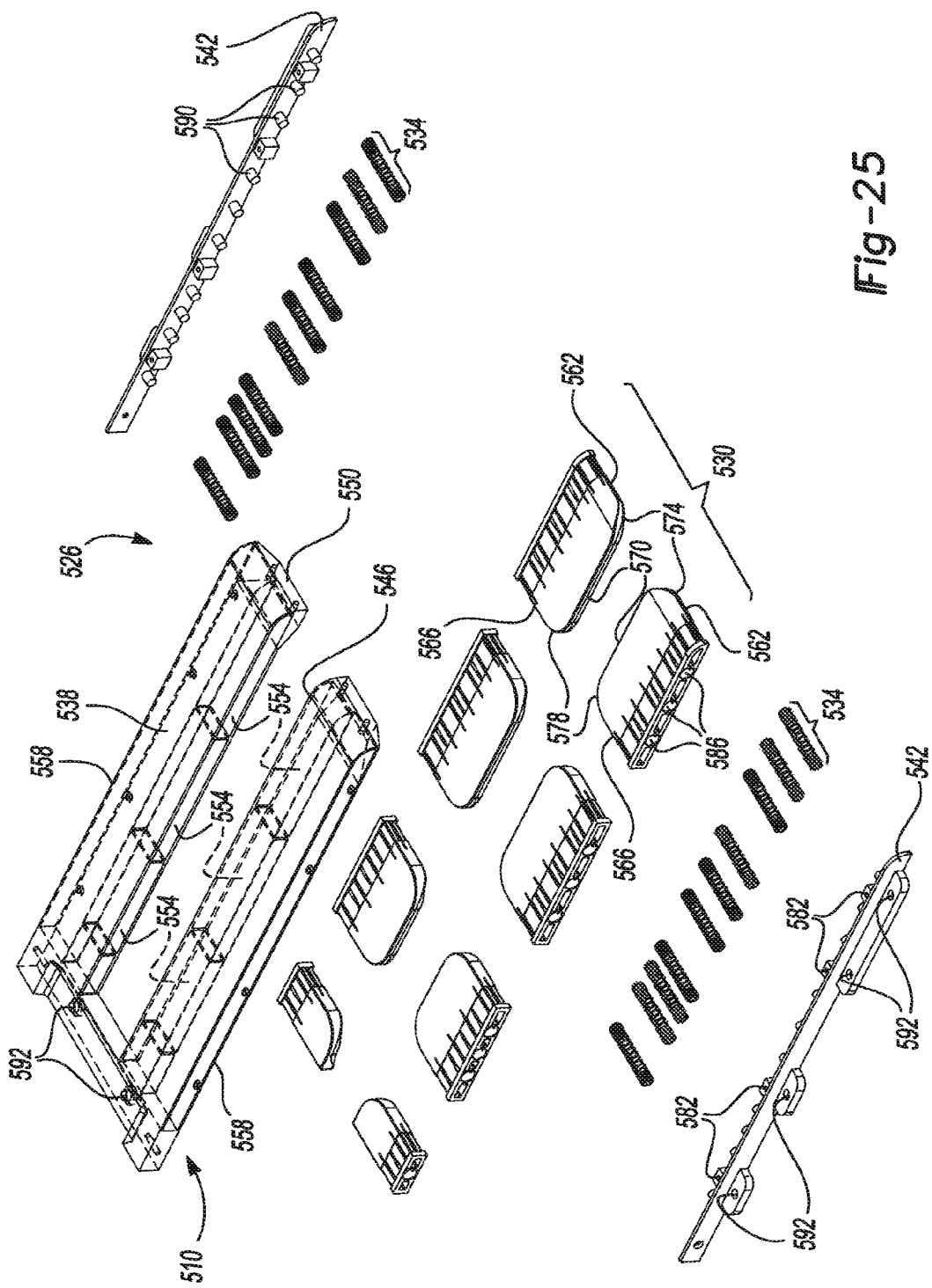
FIG. 25 is an exploded perspective view of a portion of the load floor assembly of FIG. 24.

With reference to FIGS. 24 and 25, a closeout device 510 of a fifth construction is illustrated. The closeout device 510 is configured to be mounted to a first floor panel 514 of a load floor assembly 518 that is similar to the first floor panels 310 of the load floor assemblies 308 and 408 described above and shown in FIGS. 19-23, to replace the closeout device 314.

Closeout device 510 includes a cartridge 526, a plurality of closeout members 530, and a plurality of biasing members 534. In the example provided, the cartridge 526 has a unitarily formed (e.g. molded) main body 538 and a pair of side caps 542. In the example provided, the main body 538 is formed of a first polymer material. The main body 538 has a generally U shape that defines a slot 546 that runs longitudinally along the main body 538 and is open at one end 550 of the main body 538. The main body 538 defines a plurality of guide channels 554 that are disposed laterally through the main body 538 on opposing sides of the slot 546 and are transverse to the slot 546. The guide channels 554 are open to the slot 546 and open to opposite outer sides 558 of the main body 538. Each of the guide channels 554 is configured to receive one of the closeout members 530 such that the closeout members 530 are spaced apart by the walls of the guide channels 554.

The closeout members 530 are received into the guide channels 554 from the opposite outer sides 558 of the main body 538 and extend partially into the slot 546. The closeout members 530 are slidable within the guide channels 554 such that the closeout members 530 can be moved to a closed position (shown in FIG. 24) where opposing closeout members 530 meet and abut each other within the slot 546. In the example provided, a majority of each closeout member 530 remains within the guide channels 554 when the closeout member 530 is in the closed position, though other configurations can be used. In the example provided, the closeout members 530 are formed (e.g. molded) of a second polymer material that is different from the first polymer material. The different polymer materials of the closeout members 530 and the main body 538 are selected such that their engagement results in a low coefficient of friction.

Each of the closeout members 530 has a leading edge 562, a trailing edge 566, and an abutting edge 570. The abutting edges 570 of opposing closeout members 530 abut when the closeout members 530 are in the closed position. A leading chamfer, ramp, or curve 574 is defined by the junction where the leading edge 562 meets the abutting edge 570 and a trailing chamfer, ramp, or curve 578 is defined by the junction where the trailing edge 566 meets the abutting edge 570. In the example provided, the leading curve 574 and trailing curve 578 each have a radius of approximately half the width of the risers 108, 112 (e.g. a radius of approximately 4.5 mm), though other configurations can be used.

The side caps 542 can be mounted to the outer sides 558 of the main body 538 to close the guide channels 554 and prevent the closeout members 530 from exiting the guide channels 554 from the outer sides 558. In the example provided, the side caps 542 are mounted to the main body 538 by a plurality of screws (not shown), received through a plurality of bores 582 and attached to the main body 538. The biasing members 534 are received within the main body 538 between one of the side caps 542 and the corresponding closeout members 530 to bias the closeout members 530 toward the closed position. In the example provided, the biasing members 534 are coil springs, each closeout member 530 defines at least one spring cavity 586, and the side caps 542 define a corresponding number of spring posts 590. Each biasing member 534 is disposed about one of the spring posts 590 and partially received in one spring cavity 586. In the example provided, each closeout member 530 defines three spring cavities 586 and is biased by three biasing members 534.

The closeout device 510 is mounted to the first floor panel 514 in any suitable manner. In the example provided, the side caps 542 and main body 538 define a plurality of mounting bores 592. A plurality of screws (not shown) are received though the mounting bores 592 and attached to the first floor panel 514. Thus, the closeout device 510 is a self-contained unit that can be removably mounted to the first floor panel 514.

The number, size, and position of the closeout members 530 can be configured to correspond with the size and location of the seat risers 108, 112 (FIG. 1). For example, when the seat assembly 14 is in the design position (FIG. 1) the rear riser 112 is generally in a first position (shown by dashed lines 594), and sandwiched between a first set of opposing closeout members 530, while the front risers 108 are generally in a second position (shown by dashed lines 596), and sandwiched between a second set of opposing closeout members 530. When the seat assembly 14 is in the access position (FIG. 2), the rear riser 112 is generally in the second position 596, between the second set of closeout members 530, while the front risers 108 are generally in a third position (shown by dashed lines 598), between a third set of closeout members 530.

With reference to FIGS. 26 and 27, a closeout device 610 of a sixth construction is illustrated. The closeout device 610 is similar to closeout device 510, except as shown and described herein. The closeout device 610 is configured to be mounted to a first floor panel (e.g. the first floor panels 514 and 310 of the load floor assemblies 308, 408, and 518 described above and shown in FIGS. 19-24), to replace the closeout devices 314, 510. The closeout device 610 includes the cartridge 526, the plurality of closeout members 530, and the plurality of biasing members 534. The closeout members 530 of the closeout device 610 are similar to the closeout members 530 of the closeout device 510 except as shown and described herein. In the closeout device 610, the leading edges 562 and the trailing edges 566 of adjacent closeout members 530 overlap. In the example provided, the trailing edge 566 of a first one 614 of the closeout members 530 overlaps above the leading edge 562 of a second one 618 of the closeout members 530.

The trailing edge 566 of the second one 618 of the closeout members 530 overlaps above the leading edge 562 of a third one 622 of the closeout members 530, such that the second one 618 of the closeout members 530 forms a generally Z-shaped cross-section, though other configurations can be used. In other words, the leading and trailing edges 562, 566 can each be thinner than the rest of the closeout member 530, with one of the leading or trailing edges 562, 566 being proximate to the top surface of the closeout member 530 and spaced apart (e.g. recessed) from the bottom surface of the closeout member 530, while the other one of the leading or trailing edges 562, 566 is proximate to the bottom surface of the closeout member 530 and spaced apart (e.g. recessed) from the top surface of the closeout member 530.

The trailing edge 566 of the third one 622 closeout members 530 overlaps under the leading edge 562 of a fourth one 626 of the closeout members 530 such that the third one 622 of the closeout members 530 has a generally hat-shaped cross-section, though other configurations can be used. In other words, the leading and trailing edges 562, 566 can each be thinner than the rest of the closeout member 530, with both the leading and closeout edges 562, 566 being proximate to either the top or bottom surface of the closeout member 530 and spaced apart (e.g. recessed) from the other of top or bottom surfaces of the closeout member 530. To put it another way, the closeout member 530 can have a top portion that extends from the leading edge 526 to the trailing edge 566, and a base portion that extends generally perpendicularly to the top portion and is spaced apart from the leading and trailing edges 562, 566.

The guide channels 554 are configured to match the shape of the corresponding one 614, 618, 622, 626 of the closeout members 530 received therein. While shown with four closeout members 530, it is understood that additional or fewer closeout members 530 can be used. Similar to the closeout members 530 shown in FIGS. 24 and 25, the junction of each leading and abutting edge 562, 570, and the junction of each trailing and abutting edges 566, 570 are chamfered or curved (i.e. curves 574, 578).

With reference to FIGS. 28 and 29, a closeout device 710 of a seventh construction is illustrated. The closeout device 710 is similar to closeout devices 510 and 610, except as shown and described herein. The closeout device 710 is configured to be mounted to a first floor panel (e.g. the first floor panels 514 and 310 of the load floor assemblies 308, 408, and 518 described above and shown in FIGS. 19-24), to replace the closeout devices 314, 510, and 610. The closeout device 710 includes the cartridge 526, the plurality of closeout members 530, and the plurality of biasing members 534. The closeout members 530 of the closeout device 710 are similar to the closeout members 530 of the closeout devices 510 and 610 except as shown and described herein.

The closeout members 530 of closeout device 710 have T-shaped cross-sections that alternate between right-side-up and up-side-down "T's", such that leading and trailing edges 562, 566 of adjacent closeout members 530 overlap. In other words, the leading and trailing edges 562, 566 can each be thinner than the rest of the closeout member 530, with both the leading and closeout edges 562, 566 being proximate to either the top or bottom surface of the closeout member 530 and spaced apart (e.g. recessed) from the other of top or bottom surfaces of the closeout member 530. To put it another way, the closeout member 530 can have a top portion that extends from the leading edge 526 to the trailing edge 566, and a base portion that extends generally perpendicularly to the top portion and is spaced apart from the leading and trailing edges 562, 566.

In the example provided, the closeout device 710 includes 34 total closeout members 530, though other configurations can be used. In the example provided, a single biasing member 534 biases each of the closeout members 530 toward the closed position (shown in FIG. 28). Each guide channel 554 is configured to match the shape of one corresponding closeout members 530 received therein. Similar to the closeout members 530, the junction of each closeout member's 530 leading and abutting edges 562, 570, and the junction of each trailing and abutting edges 566, 570 are chamfered or filleted.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle floor assembly comprising:
a floor frame defining a stowage cavity adapted to receive a seat assembly in a stowed position;
a first floor panel defining a pair of slots adapted to receive a pair of risers of the seat assembly through the first floor panel when the seat assembly is in a deployed position;
a second floor panel defining an aperture that extends through the second floor panel to be in communication with the stowage cavity;
a first hinge coupling the first floor panel to the second floor panel;
a second hinge coupling the second floor panel to the floor frame;
a third hinge; and
a door member coupled to the second floor panel by the third hinge, the door member being moveable relative to the second floor panel between an open position wherein the aperture of the second floor panel is open to permit access to the stowage cavity, and a closed position wherein the door member covers the aperture to prevent access to the stowage cavity.

2. The vehicle floor assembly of claim 1, wherein the second floor panel includes a rim that defines the aperture, and the floor frame includes a lip disposed about the stowage cavity, the lip being configured to support the rim above the stowage cavity.

3. The vehicle floor assembly of claim 2, wherein the lip of the floor frame is recessed from a top surface of the floor frame, the second floor panel and the door member having respective top surfaces that are substantially level with the top surface of the floor frame when the second floor panel is in a first position and the door member is in the closed position.

4. The vehicle floor assembly of claim 2, wherein the door member includes a plateau and a door rim, wherein when the door is in the closed position, the door rim is supported by the rim of the second floor panel and the plateau is received in the aperture of the second floor panel.

5. The vehicle floor assembly of claim 4, wherein a portion of the door rim overlaps with the lip of the floor frame.

6. The vehicle floor assembly of claim 1, wherein the third hinge is coupled to a side of the door member that is proximate to the first hinge.

7. The vehicle floor assembly of claim 1, wherein when the load floor is moved between the first and second positions, the first and second hinges are configured to pivot in opposite directions.

8. The vehicle floor assembly of claim 1, wherein the load floor further includes a pair of closeout devices coupled to the first floor panel, each closeout device being associated with one of the slots, each closeout device including:
   a set of closeout members that are slidably coupled to the first floor panel on opposite sides of the slot, and are moveable between a retracted position wherein opposing closeout members are retracted relative to the slot, and an extended position wherein opposing closeout members extend into the slot toward each other a greater extent than when in the retracted position; and
   a plurality of biasing members configured to bias the closeout members toward the extended position.

9. The vehicle floor assembly of claim 1, wherein the load floor further includes:
   a closeout panel that defines a pair of closeout members configured to be received in the slots; and
   a fourth hinge that couples the closeout panel to the first and second floor panels to permit the closeout panel to be pivoted between a first position wherein each closeout member is received in one of the slots, and a second position wherein the closeout members are spaced apart from the slots.

10. A vehicle floor assembly comprising:
   a floor frame defining a stowage cavity adapted to receive a seat assembly in a stowed position, the floor frame including a support lip disposed about a perimeter of the stowage cavity; and
   a load floor coupled to the floor frame and configured to be moved relative to the floor frame between a first position and a second position when the seat assembly is in a deployed position, wherein the load floor covers the stowage cavity when in the first position, and wherein the stowage cavity is open to permit the seat assembly to be moved from the deployed position to the stowed position when in the second position, the load floor including:
      a first floor panel configured to be supported above the stowage cavity by contact between the first floor panel and the support lip when the load floor is in a first position;
      a second floor panel configured to be supported above the stowage cavity by contact between the second floor panel and the support lip when the load floor is in the first position, defining an aperture that extends through the second floor panel to be in communication with the stowage cavity when the load floor is in the first position;
      a first hinge coupling the first floor panel to the second floor panel;
      a second hinge coupling the second floor panel to the floor frame;
      a third hinge; and
      a door member coupled to the second floor panel by the third hinge, the door member being moveable relative to the second floor panel between an open position wherein the aperture of the second floor panel is open to permit access to the stowage cavity while the seat assembly is in the deployed position and the load floor is in the first position, and a closed position wherein the door member covers the aperture to prevent access to the stowage cavity when the load floor is in the first position.

11. The vehicle floor assembly of claim 10, wherein the second floor panel includes a rim that defines the aperture, the support lip supporting the rim above the stowage cavity when the load floor is in the first position.

12. The vehicle floor assembly of claim 11, wherein the support lip is recessed from a top surface of the floor frame, wherein the second floor panel and the door member have respective top surfaces that are substantially level with the top surface of the floor frame when the load floor is in a first position and the door member is in the closed position.

13. The vehicle floor assembly of claim 11, wherein the door member includes a plateau and a door rim, wherein when load floor is in the first position and the door is in the closed position, the door rim is supported by the rim of the second floor panel and the plateau is received in the aperture of the second floor panel.

14. The vehicle floor assembly of claim 13, wherein when the load floor is in the first position and the door is in the closed position, a portion of the door rim overlaps with the support lip.

15. The vehicle floor assembly of claim 10, wherein the third hinge is coupled to a side of the door member that is proximate to the first hinge.

16. The vehicle floor assembly of claim 10, wherein when the load floor is moved between the first and second positions, the first and second hinges are configured to pivot in opposite directions.

17. The vehicle floor assembly of claim 10, wherein the first floor panel defines a pair of slots adapted to receive a pair of risers of the seat assembly through the first panel when the seat assembly is in a deployed position.

18. The vehicle floor assembly of claim 17, wherein the load floor further includes a pair of closeout devices coupled to the first floor panel, each closeout device being associated with one of the slots, each closeout device including:
   a set of closeout members that are slidably coupled to the first floor panel on opposite sides of the slot, and are moveable between a retracted position wherein opposing closeout members are retracted relative to the slot, and an extended position wherein opposing closeout members extend into the slot toward each other a greater extent than when in the retracted position; and
   a plurality of biasing members configured to bias the closeout members toward the extended position.

19. The vehicle floor assembly of claim 17, wherein the load floor further includes:
   a closeout panel that defines a pair of closeout members configured to be received in the slots; and
   a fourth hinge that couples the closeout panel to the first and second floor panels to permit the closeout panel to be pivoted between a first position wherein each closeout member is received in one of the slots, and a second position wherein the closeout members are spaced apart from the slots.

* * * * *